United States Patent
Wei et al.

(10) Patent No.: US 10,205,971 B2
(45) Date of Patent: Feb. 12, 2019

(54) MEDIA DATA LIVE BROADCAST METHOD, DEVICE, AND SYSTEM

(71) Applicant: Huawei Technologies Co., Ltd., Shenzhen (CN)

(72) Inventors: Qikun Wei, Nanjing (CN); Jinhui Zhang, Nanjing (CN); Jinwei Xia, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/809,074

(22) Filed: Nov. 10, 2017

(65) Prior Publication Data

US 2018/0077431 A1    Mar. 15, 2018

Related U.S. Application Data

(63) Continuation of application No. PCT/CN2015/099546, filed on Dec. 29, 2015.

(30) Foreign Application Priority Data

May 12, 2015 (CN) .......................... 2015 1 0240782

(51) Int. Cl.
*H04N 7/173* (2011.01)
*H04N 21/222* (2011.01)
(Continued)

(52) U.S. Cl.
CPC .......... *H04N 21/222* (2013.01); *H04L 12/18* (2013.01); *H04L 29/06* (2013.01); *H04L 65/105* (2013.01);
(Continued)

(58) Field of Classification Search
None
See application file for complete search history.

(56) References Cited

U.S. PATENT DOCUMENTS 7,028,071 B1 *  4/2006  Slik ........................ G06Q 30/02
                                                        348/E7.071
7,656,908 B1 *  2/2010  Begeja ............. H04N 21/26275
                                                        370/507
(Continued)

FOREIGN PATENT DOCUMENTS

CN        101001197 A       7/2007
CN        101060617 A      10/2007
(Continued)

OTHER PUBLICATIONS

"Advanced Video Coding for Generic Audiovisual Services," Series H: Audiovisual and Multimedia Systems Infrastructure of Audiovisual Services—Coding of Moving Video, ITU-T, Telecommunication Standardization Sector of ITU, H.264, Recommendation ITU-T, H.264, Feb. 2014, 790 pages.
(Continued)

*Primary Examiner* — William J Kim
(74) *Attorney, Agent, or Firm* — Slater Matsil, LLP

(57) ABSTRACT

A media data live broadcast method, a device, and a system. An over the top (OTT) live proxy server device includes a processor and non-transitory computer-readable storage medium storing instructions for allocating a multicast resource to a specified channel according to a media description and resource allocation indication of the channel instructing the OTT live proxy server to allocate the multicast resource to the specified channel, the media description including at least one resolution of the specified channel and a uniform resource locator corresponding to resolution media data, and the multicast resource including a multicast group corresponding to the specified channel, obtaining, from an OTT server to which the specified channel belongs according to the media description of the specified channel, the resolution media data, converting the media data into
(Continued)

multicast media data, and sending the multicast media data to the multicast group in a multicast manner.

20 Claims, 12 Drawing Sheets

(51) Int. Cl.
    *H04L 12/18*     (2006.01)
    *H04L 29/06*     (2006.01)
    *H04N 21/2187*     (2011.01)
    *H04N 21/2343*     (2011.01)
    *H04N 21/6405*     (2011.01)
    *H04N 21/643*     (2011.01)

(52) U.S. Cl.
    CPC ....... *H04L 65/601* (2013.01); *H04N 21/2187* (2013.01); *H04N 21/2343* (2013.01); *H04N 21/6405* (2013.01); *H04N 21/64322* (2013.01); *H04L 12/185* (2013.01); *H04L 65/4076* (2013.01)

(56) References Cited

U.S. PATENT DOCUMENTS

| | | | |
|---|---|---|---|
| 8,054,849 B2* | 11/2011 | Nadarajah | H04L 12/185 370/217 |
| 9,225,762 B2* | 12/2015 | Mack | H04L 65/605 |
| 9,544,628 B2* | 1/2017 | Mack | H04L 65/605 |
| 2004/0194143 A1* | 9/2004 | Hirose | H04N 7/17354 725/97 |
| 2007/0177632 A1* | 8/2007 | Oz | H04N 7/17318 370/486 |
| 2007/0280230 A1 | 12/2007 | Park | |
| 2009/0168679 A1* | 7/2009 | Benjamim | H04H 20/26 370/312 |
| 2009/0265743 A1 | 10/2009 | Gao | |
| 2009/0276821 A1* | 11/2009 | Amento | H04N 7/17318 725/116 |
| 2010/0058405 A1* | 3/2010 | Ramakrishnan | H04N 7/17318 725/97 |
| 2010/0103950 A1* | 4/2010 | Statelov | H04N 21/234327 370/468 |
| 2012/0023533 A1* | 1/2012 | Wang | H04N 21/4622 725/109 |
| 2012/0198506 A1* | 8/2012 | Joe | H04N 21/44209 725/97 |
| 2013/0132986 A1* | 5/2013 | Mack | H04L 65/605 725/14 |
| 2013/0139210 A1* | 5/2013 | Huang | H04W 4/06 725/109 |
| 2013/0179588 A1* | 7/2013 | McCarthy | H04N 21/23418 709/231 |
| 2013/0268986 A1* | 10/2013 | Venkatachalam | H04N 21/2365 725/109 |
| 2014/0115062 A1* | 4/2014 | Liu | H04L 29/08729 709/204 |
| 2015/0029925 A1* | 1/2015 | Mantin | H04W 72/005 370/312 |
| 2015/0030022 A1* | 1/2015 | Mantin | H04L 65/80 370/390 |
| 2015/0036526 A1* | 2/2015 | Mantin | H04N 21/2402 370/252 |
| 2015/0043580 A1* | 2/2015 | Mantin | H04L 12/189 370/390 |
| 2015/0046568 A1* | 2/2015 | Mantin | H04L 65/60 709/219 |
| 2015/0049762 A1 | 2/2015 | Mantin | |
| 2016/0173922 A1* | 6/2016 | Clancy | H04N 21/251 725/14 |

FOREIGN PATENT DOCUMENTS

| | | |
|---|---|---|
| CN | 101340305 A | 1/2009 |
| CN | 103841453 A | 6/2014 |
| CN | 104066125 A | 9/2014 |
| WO | 2013074313 A1 | 5/2013 |
| WO | 2015017515 A1 | 2/2015 |

OTHER PUBLICATIONS

"High Efficiency Video Coding," International Telecommunication Union, Series H: Audiovisual and Multimedia Systems Infrastructure of Audiovisual Services—Coding of Moving Video, ITU-T, Telecommunication Standardization Sector of ITU, H.265, Recommendation ITU-T, H.265, Apr. 2015, 634 pages.

* cited by examiner

MEDIA DATA LIVE BROADCAST METHOD, DEVICE, AND SYSTEM

CROSS-REFERENCE TO RELATED APPLICATIONS

This application is a continuation of International Application No. PCT/CN2015/099546, filed on Dec. 29, 2015, which claims priority to Chinese Patent Application No. 201510240782.0, filed on May 12, 2015. The disclosures of the aforementioned applications are hereby incorporated by reference in their entireties.

TECHNICAL FIELD

Embodiments of the present invention relate to the field of computer networks, and more specifically, to a media data live broadcast method, a device, and a system.

BACKGROUND

Videos on an over the top (OTT) video website are classified into video on demand (VOD) and video on live (VOL) according to watching forms.

Video on demand refers to: Watch videos stored on a video server. Because the videos have been produced completely, during watching, the videos may be stopped, fast-forwarded, or rewound at any time, or progress bars of the videos may be dragged forward or backward at any time.

Video on live refers to: Play a real-time video, which is generally content of various television channels, or outside broadcasting of sports events or concerts. In this case, a progress bar cannot be dragged forward or backward, and audiences watching same live media data watch totally same content.

An OTT server is owned by an OTT service provider (a company providing an OTT video website service), and may be placed in a data center of an operator in a particular city, or may be placed in a machine room of the OTT service provider. The OTT server can provide services of registration, login, presenting a program window, sending streaming media, or the like to an OTT user. During specific deployment of the OTT server, usually multiple physical servers provide a function to the outside together.

An OTT client refers to a terminal on which an OTT user watches an OTT video. Three common forms of the OTT client are: a desktop client on a desktop computer or a notebook computer, a mobile application on a mobile phone or a tablet computer, and an OTT set top box.

Currently, most of video transmission on an OTT video website is unicast based on the Hypertext Transfer Protocol (HTTP), and some video transmission is unicast based on the User Datagram Protocol (UDP). This means that an OTT user watching live media data transmits a large quantity of repeated data packets on a network. The large quantity of repeated packets of the live media data seriously occupies bandwidth of a bearer network.

SUMMARY

Embodiments of the present invention provide a media data live broadcast method, a device, and a system, so as to avoid a large quantity of repeated live streams from passing through a backbone network, and reduce bandwidth of a bearer network occupied by live media data.

According to a first aspect, an OTT live proxy server is provided, including: a multicast resource allocation unit, configured to allocate a multicast resource to a specified channel according to a multicast resource allocation indication of the specified channel and a media description of the specified channel, where the multicast resource allocation indication is used to instruct the OTT live proxy server to allocate the multicast resource to the specified channel, the media description of the specified channel includes at least one resolution of the specified channel and a URL corresponding to media data of the at least one resolution, and the multicast resource includes a multicast group corresponding to the specified channel, or a multicast group that corresponds to the specified channel and a port that corresponds to the at least one resolution; an obtaining unit, configured to obtain, from an OTT server to which the specified channel belongs and in a unicast manner according to the media description of the specified channel, the media data corresponding to the at least one resolution; and a multicast unit, configured to: convert the media data corresponding to the at least one resolution into multicast media data, and send the multicast media data to the multicast group in a multicast manner.

With reference to the first aspect, in a first possible implementation manner, the obtaining unit is further configured to obtain the media description of the specified channel from the OTT server; or the media description of the specified channel is pre-stored on the OTT live proxy server.

With reference to the first aspect or the first possible implementation manner of the first aspect, in a second possible implementation manner, a specific implementation manner is: The multicast resource allocation indication is sent by the OTT server; or the multicast resource allocation indication is sent by a multicast replication point in a metropolitan area network in which the OTT live proxy server is located.

With reference to the first aspect, the first possible implementation manner of the first aspect, or the second possible implementation manner of the first aspect, in a third possible implementation manner, the OTT live proxy server further includes: a forwarding unit, configured to receive a channel joining indication sent by the OTT server, and send the channel joining indication to the multicast replication point in the metropolitan area network in which the OTT live proxy server is located, so that the multicast replication point adds an OTT client to an authorized subscriber list of the specified channel, where the channel joining indication is used to indicate that the OTT client is allowed to join the specified channel.

With reference to any one of the first aspect, or the first possible implementation manner of the first aspect to the third possible implementation manner of the first aspect, in a fourth possible implementation manner, the OTT live proxy server further includes: a registration unit, configured to register, with the OTT server, an Internet Protocol (IP) network segment of the metropolitan area network in which the OTT live proxy server is located and an IP address of the OTT live proxy server.

With reference to any one of the first aspect or the first possible implementation manner of the first aspect to the fourth possible implementation manner of the first aspect, in a fifth possible implementation manner, the multicast resource allocation unit is further configured to feed back the allocated multicast resource to the OTT server, so that the OTT server sends the multicast resource to the OTT client, and the OTT client can join the multicast group.

With reference to any one of the first aspect or the first possible implementation manner of the first aspect to the fifth possible implementation manner of the first aspect, in a sixth possible implementation manner, the multicast resource allocation unit is further configured to send a correspondence between the specified channel and the multicast group of the specified channel to the multicast replication point in the metropolitan area network in which the OTT live proxy server is located, so that the multicast replication point determines, according to a request sent by the OTT client for joining the specified channel, the multicast group corresponding to the specified channel.

With reference to the sixth possible implementation manner of the first aspect, in a seventh possible implementation manner, the multicast resource allocation unit is further configured to send the multicast resource to the OTT client according to the request sent by the OTT client for joining the specified channel, so that the OTT client requests the media data of the specified channel from the multicast replication point.

With reference to any one of the first aspect or the first possible implementation manner of the first aspect to the seventh possible implementation manner of the first aspect, in an eighth possible implementation manner, the OTT live proxy server further includes: a multicast group management unit, configured to add the multicast replication point to the multicast group according to a multicast joining request of the multicast replication point, and add an egress port corresponding to the multicast replication point to a multicast forwarding entry of the multicast group, or delete the multicast replication point from the multicast group according to a multicast leave request of the multicast replication point, and delete an egress port corresponding to the multicast replication point from a multicast forwarding entry of the multicast group.

With reference to the eighth possible implementation manner of the first aspect, in a ninth possible implementation manner, the multicast resource allocation unit is further configured to when a quantity of egress ports in the multicast forwarding entry of the multicast group is zero, delete the multicast forwarding entry of the multicast group, and disconnect a link for downloading the media data of the specified channel from the OTT server.

According to a second aspect, an OTT server is provided, including: a multicast resource allocation indication unit, configured to send a multicast resource allocation indication to an OTT live proxy server registered with the OTT server, where the multicast resource allocation indication is used to instruct the OTT live proxy server to allocate a multicast resource to a specified channel, a media description management unit, configured to send a media description of the specified channel to the OTT live proxy server according to a request sent by the OTT live proxy server for obtaining the media description of the specified channel, where the media description of the specified channel includes at least one resolution of the specified channel and a URL corresponding to media data of the at least one resolution; and a media resource management unit, configured to send the media data of the at least one resolution of the specified channel to the OTT live proxy server in a unicast manner according to a request of the OTT live proxy server for obtaining the media data of the specified channel.

With reference to the second aspect, in a first possible implementation manner, the OTT server further includes a registration unit, configured to record an Internet Protocol (IP) network segment of a metropolitan area network in which the OTT live proxy server is located and an IP address of the OTT live proxy server according to a registration request sent by the OTT live proxy server, where the registration request carries the IP network segment of the metropolitan area network in which the OTT live proxy server is located and the IP address of the OTT live proxy server.

With reference to the second aspect or the first possible implementation manner of the second aspect, in a second possible implementation manner, the OTT server further includes an authentication unit, configured to determine, according to a request for joining the specified channel by an OTT client in the metropolitan area network in which the OTT live proxy server is located, whether to allow the OTT client to join the specified channel, and the multicast resource allocation indication unit is specifically configured to: after the authentication unit determines to allow the OTT client to join the specified channel, and when the multicast resource of the specified channel sent by the OTT live proxy server does not exist in the OTT server, send the multicast resource allocation indication to the OTT live proxy server.

With reference to the second possible implementation manner of the second aspect, in a third possible implementation manner, the authentication unit is further configured to: after allowing the OTT client to join the specified channel, send a channel joining indication to the OTT live proxy server, where the channel joining indication is used to notify the OTT live proxy server that the OTT client is allowed to join the specified channel.

With reference to the second possible implementation manner of the second aspect, in a fourth possible implementation manner, the authentication unit is further configured to send, to the OTT client, the multicast resource that is fed back by the OTT live proxy server and that is allocated to the specified channel, so that the OTT client requests the media data of the specified channel from a multicast replication point, where the multicast resource includes a multicast group corresponding to the specified channel, or a multicast group corresponding to the specified channel and a port corresponding to the at least one resolution of the specified channel.

With reference to the second possible implementation manner of the second aspect, in a fifth possible implementation manner, the OTT server further includes: a redirection instruction unit, configured to instruct, according to the request of the OTT client for joining the specified channel and the multicast resource of the specified channel, the OTT client to redirect the request for joining the specified channel to the OTT live proxy server.

According to a third aspect, a multicast replication point is provided, including: a multicast management unit, configured to send a request to an OTT live proxy server in a metropolitan area network in which the multicast replication point is located, to request to join a multicast group that is allocated by the OTT live proxy server to a specified channel; a media data obtaining unit, configured to receive media data of the specified channel that is sent by the OTT live proxy server in a multicast manner; and a media data management unit, configured to send the media data of the specified channel to an OTT client in a multicast or unicast manner.

With reference to the third aspect, in a first possible implementation manner, the multicast replication point further includes a permission management unit, configured to add the OTT client to an authorized subscriber list of the specified channel according to a channel joining indication sent by the OTT live proxy server in the metropolitan area network, where the channel joining indication is used to notify the multicast replication point that the OTT client is allowed to join the specified channel.

With reference to the third aspect or the first possible implementation manner of the third aspect, in a second possible implementation manner, the multicast management unit is further configured to: add the OTT client to a multicast forwarding table of the multicast replication point according to a multicast joining request for joining the specified channel or a media data request, and send a request to the OTT live proxy server to request to join the multicast group, where the multicast joining request for joining the specified channel or the media data request is sent by the OTT client, or delete the OTT client from a multicast forwarding table of the multicast replication point according to a request sent by the OTT client for leaving the specified channel.

According to a fourth aspect, a media data live broadcast method is provided, including: allocating a multicast resource to a specified channel according to a multicast resource allocation indication of the specified channel and a media description of the specified channel, where the multicast resource allocation indication is used to instruct an OTT live proxy server to allocate the multicast resource to the specified channel, the media description of the specified channel includes at least one resolution of the specified channel and a URL corresponding to media data of the at least one resolution, and the multicast resource includes a multicast group corresponding to the specified channel, or a multicast group that corresponds to the specified channel and a port that corresponds to the at least one resolution, obtaining, from an OTT server to which the specified channel belongs and in a unicast manner according to the media description of the specified channel, the media data corresponding to the at least one resolution; and converting the media data corresponding to the at least one resolution into multicast media data, and sending the multicast media data to the multicast group in a multicast manner.

With reference to the fourth aspect, in a first possible implementation manner, before the allocating a multicast resource to a specified channel according to a multicast resource allocation indication of the specified channel and a media description of the specified channel, the method further includes obtaining the media description of the specified channel from the OTT server; or the media description of the specified channel is pre-stored on the OTT live proxy server.

With reference to the fourth aspect or the first possible implementation manner of the fourth aspect, in a second possible implementation manner, before the allocating a multicast resource to a specified channel according to a multicast resource allocation indication of the specified channel and a media description of the specified channel, the method further includes: receiving the multicast resource allocation indication of the specified channel, where the multicast resource allocation indication is sent by the OTT server, or the multicast resource allocation indication is sent by a multicast replication point in a metropolitan area network in which the OTT live proxy server is located.

With reference to the fourth aspect, the first possible implementation manner of the fourth aspect, or the second possible implementation manner of the fourth aspect, in a third possible implementation manner, the method further includes: receiving a channel joining indication sent by the OTT server, and sending the channel joining indication to the multicast replication point in the metropolitan area network in which the OTT live proxy server is located, so that the multicast replication point adds an OTT client to an authorized subscriber list of the specified channel, where the channel joining indication is used to indicate that the OTT client is allowed to join the specified channel.

With reference to any one of the fourth aspect, or the first possible implementation manner of the fourth aspect to the third possible implementation manner of the fourth aspect, in a fourth possible implementation manner, the method further includes: registering, with the OTT server, an Internet Protocol (IP) network segment of the metropolitan area network in which the OTT live proxy server is located and an IP address of the OTT live proxy server.

With reference to any one of the fourth aspect or the first possible implementation manner of the fourth aspect to the fourth possible implementation manner of the fourth aspect, in a fifth possible implementation manner, the method further includes: feeding back the allocated multicast resource to the OTT server, so that the OTT server sends the multicast resource to the OTT client, and the OTT client can join the multicast group.

With reference to any one of the fourth aspect or the first possible implementation manner of the fourth aspect to the fifth possible implementation manner of the fourth aspect, in a sixth possible implementation manner, the method further includes sending a correspondence between the specified channel and the multicast group of the specified channel to the multicast replication point in the metropolitan area network in which the OTT live proxy server is located, so that the multicast replication point determines, according to a request sent by the OTT client for joining the specified channel, the multicast group corresponding to the specified channel.

With reference to the sixth possible implementation manner of the fourth aspect, in a seventh possible implementation manner, the method further includes: sending the multicast resource to the OTT client according to the request sent by the OTT client for joining the specified channel, so that the OTT client requests the media data of the specified channel from the multicast replication point.

With reference to any one of the fourth aspect or the first possible implementation manner of the fourth aspect to the seventh possible implementation manner of the fourth aspect, in an eighth possible implementation manner, the method further includes adding the multicast replication point to the multicast group according to a multicast joining request of the multicast replication point, and adding an egress port corresponding to the multicast replication point to a multicast forwarding entry of the multicast group, or delete the multicast replication point from the multicast group according to a multicast leave request of the multicast replication point, and delete an egress port corresponding to the multicast replication point from a multicast forwarding entry of the multicast group.

With reference to the eighth possible implementation manner of the fourth aspect, in a ninth possible implementation manner, the method further includes: when a quantity of egress ports in the multicast forwarding entry of the multicast group is zero, deleting the multicast forwarding entry of the multicast group, and disconnecting a link for downloading the media data of the specified channel from the OTT server.

According to a fifth aspect, a media data live broadcast method is provided, including: sending, by an OTT server, a multicast resource allocation indication to an OTT live proxy server registered with the OTT server, where the multicast resource allocation indication is used to instruct the OTT live proxy server to allocate a multicast resource to a specified channel; sending, by the OTT server, a media description of the specified channel to the OTT live proxy server according to a request sent by the OTT live proxy server for obtaining the media description of the specified channel, where the media description of the specified channel includes at least one resolution of the specified channel and a URL corresponding to media data of the at least one resolution; and sending, by the OTT server, the media data of the at least one resolution of the specified channel to the OTT live proxy server in a unicast manner according to a request of the OTT live proxy server for obtaining the media data of the specified channel.

With reference to the fifth aspect, in a first possible implementation manner, the method further includes recording, by the OTT server, an Internet Protocol (IP) network segment of a metropolitan area network in which the OTT live proxy server is located and an IP address of the OTT live proxy server according to a registration request sent by the OTT live proxy server, where the registration request carries the IP network segment of the metropolitan area network in which the OTT live proxy server is located and the IP address of the OTT live proxy server.

With reference to the fifth aspect or the first possible implementation manner of the fifth aspect, in a second possible implementation manner, the method further includes determining, by the OTT server according to a request for joining the specified channel by an OTT client in the metropolitan area network in which the OTT live proxy server is located, whether to allow the OTT client to join the specified channel; and the sending, by an OTT server, a multicast resource allocation indication to an OTT live proxy server registered with the OTT server includes: after the OTT server determines to allow the OTT client to join the specified channel, and when the multicast resource of the specified channel sent by the OTT live proxy server does not exist in the OTT server, sending, by the OTT server, the multicast resource allocation indication to the OTT live proxy server.

With reference to the second possible implementation manner of the fifth aspect, in a third possible implementation manner, the method further includes: sending, by the OTT server, a channel joining indication to the OTT live proxy server after allowing the OTT client to join the specified channel, where the channel joining indication is used to notify the OTT live proxy server that the OTT client is allowed to join the specified channel.

With reference to the second possible implementation manner of the fifth aspect, in a fourth possible implementation manner, the method further includes sending, by the OTT server to the OTT client, the multicast resource that is fed back by the OTT live proxy server and that is allocated to the specified channel, so that the OTT client requests the media data of the specified channel from a multicast replication point, where the multicast resource includes a multicast group corresponding to the specified channel, or a multicast group corresponding to the specified channel and a port corresponding to the at least one resolution of the specified channel.

With reference to the second possible implementation manner of the fifth aspect, in a fifth possible implementation manner, the method further includes: instructing, by the OTT server, the OTT client to redirect the request for joining the specified channel to the OTT live proxy server according to the request of the OTT client for joining the specified channel and the multicast resource of the specified channel.

According to a sixth aspect, a media data live broadcast method is provided, including: sending a request to an OTT live proxy server in a metropolitan area network, to request to join a multicast group that is allocated by the OTT live proxy server to a specified channel, receiving media data of the specified channel that is sent by the OTT live proxy server in a multicast manner, and sending the media data of the specified channel to an OTT client in a multicast or unicast manner.

With reference to the sixth aspect, in a first possible implementation manner, the method further includes adding the OTT client to an authorized subscriber list of the specified channel according to a channel joining indication sent by the OTT live proxy server, where the channel joining indication is used to indicate that the OTT client is allowed to join the specified channel.

With reference to the sixth aspect or the first possible implementation manner of the sixth aspect, in a second possible implementation manner, the method further includes adding the OTT client to a multicast forwarding table of a multicast replication point according to a multicast joining request for joining the specified channel or a media data request, where the multicast joining request for joining the specified channel or the media data request is sent by the OTT client, and sending a request to the OTT live proxy server to request to join the multicast group; or deleting the OTT client from a multicast forwarding table of a multicast replication point according to a request sent by the OTT client for leaving the specified channel.

According to the media data live broadcast method, the device, and the system that are in the embodiments of the present invention, an OTT server transmits media data of a specified channel to an OTT live proxy server in a metropolitan area network in a unicast manner, and the OTT live proxy server sends the media data to a multicast group in a multicast manner, so that after receiving the media data, a multicast replication point in the multicast group transmits the media data to an OTT client. In this way, a quantity of repeated packets transmitted from the OTT server to the metropolitan area network can be reduced, thereby avoiding a large quantity of repeated live streams from passing through a backbone network, and reducing bandwidth of a bearer network occupied by live media data.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

To easily understand the embodiments of the present invention, some elements used in descriptions of the embodiments of the present invention are first described herein.

Multicast transmission is a point-to-multipoint network connection is implemented between a transmitter and each receiver. If one transmitter transmits same data to multiple receivers at the same time, only one same data packet needs to be copied. This improves data transmission efficiency, and reduces a probability of congestion in a backbone network.

Internet Group Management Protocol (IGMP) is a multicast protocol in the Internet Protocol family. The protocol runs between a host and a multicast router, and is used to establish and maintain a multicast group membership between an IP host and a neighboring multicast router. In an intra-domain multicast routing protocol, a multicast distribution tree is constructed by using a particular multicast routing algorithm according to information about the multicast group membership maintained by the IGMP, so as to forward a multicast data packet. In an inter-domain multicast routing protocol, routing information having a multicast capability and multicast source information are distributed between autonomous systems, so as to forward multicast data between the domains.

Figure 1:
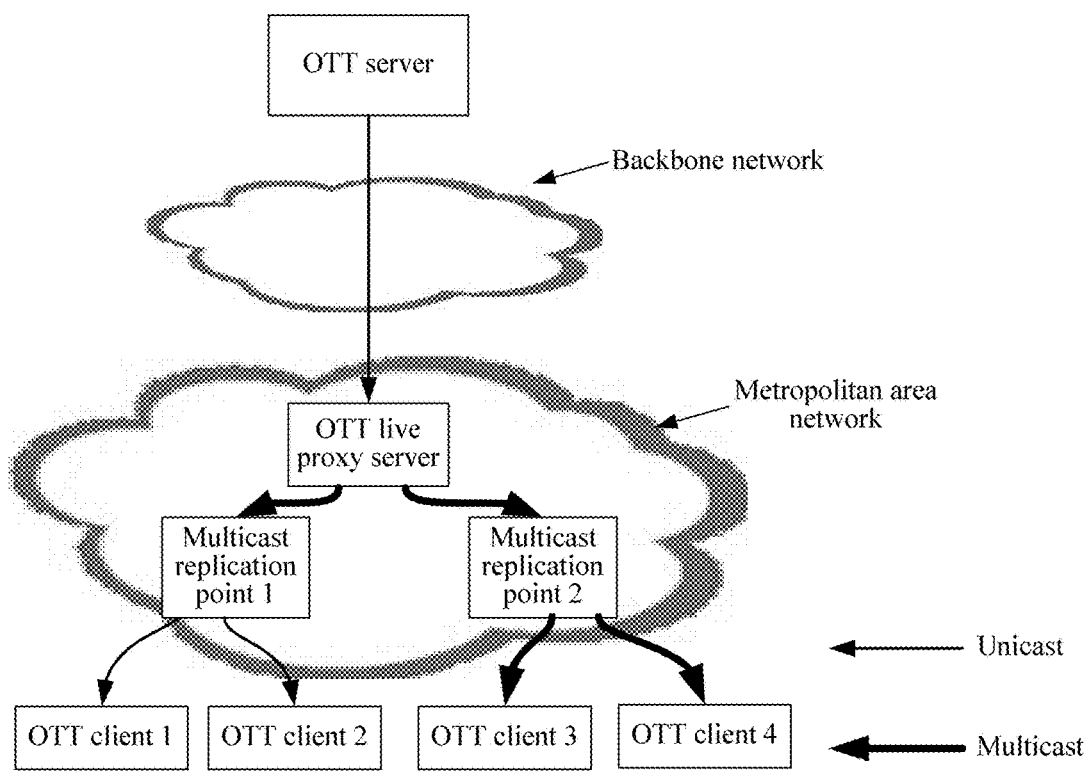
FIG. 1 is a network architectural diagram of an OTT system for live broadcasting media data according to an embodiment.

FIG. 1 is a network architectural diagram of an OTT system for live broadcasting media data according to an embodiment of the present invention. As shown in FIG. 1, the OTT system may include an OTT server, an OTT live proxy server, a multicast replication point, and an OTT client. The OTT server may be located in a data center of an operator in a particular city, or be in a machine room of an OTT service provider. The OTT live proxy server, the multicast replication point, and the OTT client are in a same metropolitan area network. When a user requests, by using the OTT client, to watch an audio program or a video program of a particular channel on the OTT server, a media stream of the channel on the OTT server is transmitted to the OTT live proxy server in the metropolitan area network in a unicast manner by using a backbone network. The OTT live proxy server sends the media stream of the channel to a multicast group in a multicast manner, and a multicast replication point in the multicast group sends the media stream of the channel to the OTT client in a unicast or multicast manner.

The following describes, separately from the perspectives of an OTT live proxy server, an OTT server, and a multicast replication point, a method executed by the OTT system shown in FIG. 1.

Figure 2:
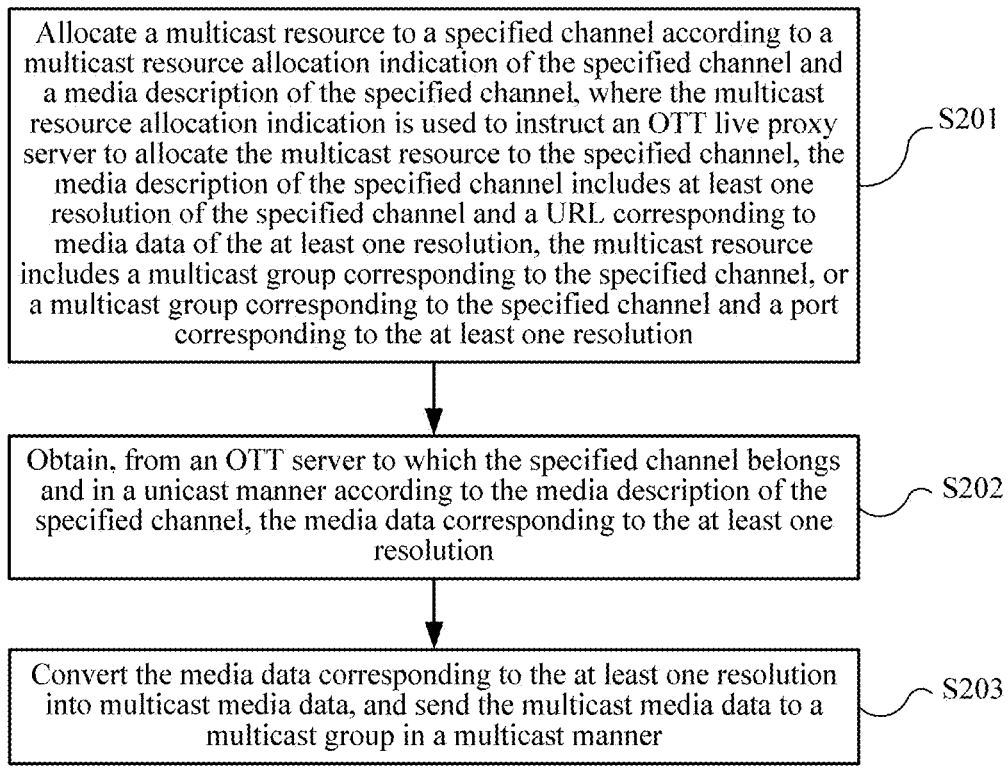
FIG. 2 is a flowchart of a media data live broadcast method according to an embodiment.

FIG. 2 is a flowchart of a media data live broadcast method according to an embodiment of the present invention. The method in FIG. 2 is executed by an OTT live proxy server. The method includes the following steps.

S201: Allocate a multicast resource to a specified channel according to a multicast resource allocation indication of the specified channel and a media description of the specified channel.

The multicast resource allocation indication is used to instruct the OTT live proxy server to allocate the multicast resource to the specified channel. The media description of the specified channel includes at least one resolution of the specified channel and a uniform resource locator (URL) corresponding to media data of the at least one resolution. The multicast resource includes a multicast group corresponding to the specified channel, or a multicast group corresponding to the specified channel and a port corresponding to the at least one resolution.

Certainly, it should be understood that, before step S201, the OTT live proxy server further needs to receive the multicast resource allocation indication. The multicast resource allocation indication is sent by an OTT server of the OTT live proxy server, or the multicast resource allocation indication is sent by a multicast replication point in a metropolitan area network in which the OTT live proxy server is located.

S202: Obtain, from an OTT server to which the specified channel belongs and in a unicast manner according to the media description of the specified channel, media data corresponding to at least one resolution.

Specifically, the OTT live proxy server may obtain, in a unicast manner according to the URL in the media description, the media data corresponding to the URL.

S203: Convert the media data corresponding to the at least one resolution into multicast media data, and send the multicast media data to a multicast group in a multicast manner.

In this embodiment of the present invention, an OTT live proxy server allocates a multicast resource of a channel according to a channel allocation indication of an OTT server, obtains media data of the channel from the OTT server, and sends, in a multicast manner, the media data of the channel to a multicast group corresponding to the channel, so that a multicast replication point in the multicast group can transmit the media data of the channel to an OTT client joining the channel. In this way, a large quantity of repeated live streams can be avoided from passing through a backbone network, thereby greatly reducing a quantity of repeated packets transmitted from the OTT server to a metropolitan area network, and reducing bandwidth of a bearer network occupied by live media data.

In addition, compared with that the OTT client obtains an audio program or a video program of the channel from the OTT server, in the method in this embodiment of the present invention, the OTT client obtains an audio program or a video program of the channel from a nearest network device (multicast replication point). This can shorten a video start delay and reduce a packet loss rate/jerkiness, thereby providing better user experience.

Optionally, in an embodiment, before step S201, the method further includes: obtaining the media description of the specified channel from the OTT server.

Optionally, in another embodiment, the media description of the specified channel is pre-stored on the OTT live proxy server. An OTT service vendor may pre-store related media descriptions of some or all channels on the OTT live proxy server, to reduce information exchange caused by a media description request.

Optionally, the method further includes: receiving a channel joining indication sent by the OTT server, and sending the channel joining indication to the multicast replication point in the metropolitan area network in which the OTT live proxy server is located, so that the multicast replication point adds the OTT client to an authorized subscriber list of the specified channel, where the channel joining indication is used to indicate that the OTT client is allowed to join the specified channel.

Optionally, the method further includes: registering, with the OTT server, an Internet Protocol (IP) network segment of the metropolitan area network in which the OTT live proxy server is located and an IP address of the OTT live proxy server.

Optionally, in an embodiment, the method further includes: feeding back the allocated multicast resource to the OTT server, so that the OTT server sends the multicast resource to the OTT client, and the OTT client can join the multicast group.

Optionally, in another embodiment, the method further includes: sending a correspondence between the specified channel and the multicast group of the specified channel to the multicast replication point in the metropolitan area network in which the OTT live proxy server is located, so that the multicast replication point determines, according to a request sent by the OTT client for joining the specified channel, the multicast group corresponding to the specified channel.

Further, the method further includes: sending the multicast resource to the OTT client according to the request sent by the OTT client for joining the specified channel, so that the OTT client requests the media data of the specified channel from the multicast replication point.

Optionally, in an embodiment, the method further includes: adding the multicast replication point to the multicast group according to a multicast joining request of the multicast replication point, and adding an egress port corresponding to the multicast replication point to a multicast forwarding entry of the multicast group.

Optionally, in another embodiment, the method further includes: deleting the multicast replication point from the multicast group according to a multicast leave request of the multicast replication point, and deleting an egress port corresponding to the multicast replication point from a multicast forwarding entry of the multicast group.

Further, the method further includes: when a quantity of egress ports in the multicast forwarding entry of the multicast group is zero, deleting the multicast forwarding entry of the multicast group, and disconnecting a link for downloading the media data of the specified channel from the OTT server.

Figure 3:
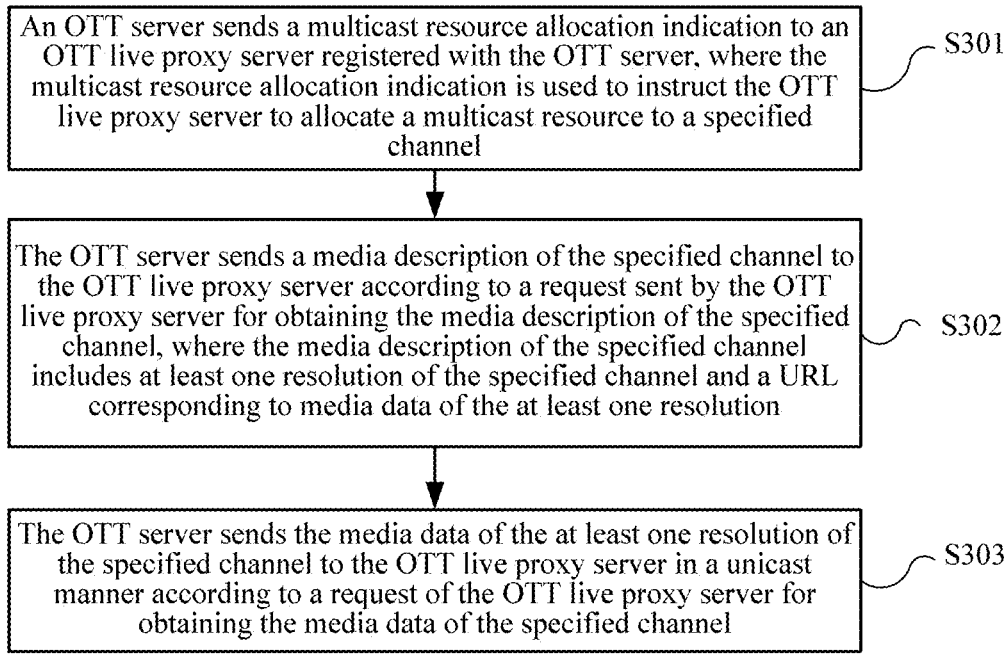
FIG. 3 is a flowchart of another media data live broadcast method according to an embodiment.

FIG. 3 is a flowchart of another media data live broadcast method according to an embodiment of the present invention. The method in FIG. 3 is executed by the OTT server. The method includes the following steps.

S301: An OTT server sends a multicast resource allocation indication to an OTT live proxy server registered with the OTT server.

The multicast resource allocation indication is used to instruct the OTT live proxy server to allocate a multicast resource to a specified channel.

S302: The OTT server sends a media description of a specified channel to the OTT live proxy server according to a request sent by the OTT live proxy server for obtaining the media description of the specified channel.

The media description of the specified channel includes at least one resolution of the specified channel and a URL corresponding to media data of the at least one resolution.

S303: The OTT server sends media data of at least one resolution of the specified channel to the OTT live proxy server in a unicast manner according to a request of the OTT live proxy server for obtaining the media data of the specified channel.

In this embodiment of the present invention, an OTT server instructs an OTT live proxy server to create a multicast group and allocate a multicast resource of a channel, and sends media data of the channel to the OTT live proxy server in a unicast manner, so that the OTT live proxy server sends, by using a multicast replication point, the media data of the channel to an OTT client joining the multicast group. In this way, a large quantity of repeated live streams can be avoided from passing through a backbone network, thereby greatly reducing a quantity of repeated packets transmitted from the OTT server to a metropolitan area network, and reducing bandwidth of a bearer network occupied by live media data.

Optionally, the method further includes: recording, by the OTT server, an Internet Protocol (IP) network segment of a metropolitan area network in which the OTT live proxy server is located and an IP address of the OTT live proxy server according to a registration request sent by the OTT live proxy server. The registration request carries the IP network segment of the metropolitan area network in which the OTT live proxy server is located and the IP address of the OTT live proxy server.

Optionally, in an embodiment, the method further includes: determining, by the OTT server according to a request for joining the specified channel by an OTT client in the metropolitan area network in which the OTT live proxy server is located, whether to allow the OTT client to join the specified channel. Further, specific implementation of the sending, by an OTT server, a multicast resource allocation indication to an OTT live proxy server registered with the OTT server is, after the OTT server determines to allow the OTT client to join the specified channel, and when the multicast resource of the specified channel sent by the OTT live proxy server does not exist in the OTT server, sending, by the OTT server, the multicast resource allocation indication to the OTT live proxy server.

Optionally, the method further includes sending, by the OTT server, a channel joining indication to the OTT live proxy server after allowing the OTT client to join the specified channel. The channel joining indication is used to notify the OTT live proxy server that the OTT client is allowed to join the specified channel.

Further, in an embodiment, the method further includes: sending, by the OTT server to the OTT client, the multicast resource that is fed back by the OTT live proxy server and that is allocated to the specified channel, so that the OTT client requests the media data of the specified channel from the multicast replication point. The multicast resource includes a multicast group corresponding to the specified channel, or a multicast group corresponding to the specified channel and a port corresponding to the at least one resolution of the specified channel.

Alternatively, further, in another embodiment, the method further includes: instructing, by the OTT server, the OTT client to redirect the request for joining the specified channel to the OTT live proxy server according to the request of the OTT client for joining the specified channel and the multicast resource of the specified channel.

Figure 4:
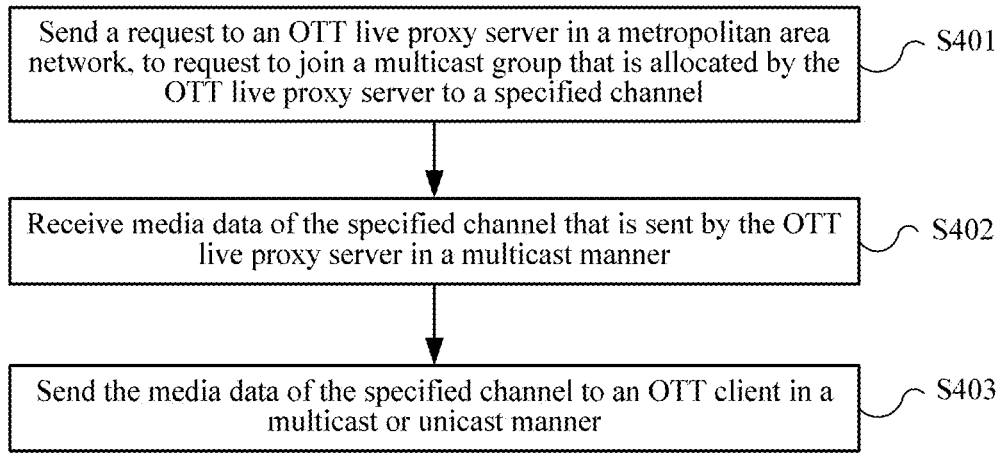
FIG. 4 is a flowchart of still another media data live broadcast method according to an embodiment.

FIG. 4 is a flowchart of still another media data live broadcast method according to an embodiment of the present invention. The method in FIG. 4 is executed by a multicast replication point. The method includes the following steps.

S401: Send a request to an OTT live proxy server in a metropolitan area network in which the multicast replication point is located, to request to join a multicast group that is allocated by the OTT live proxy server to a specified channel.

S402: Receive media data of the specified channel that is sent by the OTT live proxy server in a multicast manner.

S403: Send the media data of the specified channel to an OTT client in a multicast or unicast manner.

In this embodiment of the present invention, a multicast replication point obtains media data of a channel from a multicast group created by an OTT live proxy server and sends the media data to an OTT client, so that the OTT client does not need to obtain the media data of the channel from an OTT server. In this way, a large quantity of repeated live streams can be avoided from passing through a backbone network, thereby greatly reducing a quantity of repeated packets transmitted from the OTT server to a metropolitan area network, and reducing bandwidth of a bearer network occupied by live media data.

Optionally, in an embodiment, the method further includes: adding the OTT client to a multicast forwarding table of the multicast replication point according to a multicast joining request for joining the specified channel or a media data request, and sending a request to the OTT live proxy server to request to join the multicast group, where the multicast joining request for joining the specified channel or the media data request is sent by the OTT client.

Optionally, in another embodiment, the method further includes: deleting the OTT client from a multicast forwarding table of the multicast replication point according to a request sent by the OTT client for leaving the specified channel.

Optionally, the method further includes: adding the OTT client to an authorized subscriber list of the specified channel according to a channel joining indication sent by the OTT live proxy server, where the channel joining indication is used to indicate that the OTT client is allowed to join the specified channel.

It should be understood that, before the adding the OTT client to an authorized subscriber list of the specified channel according to a channel joining indication sent by the OTT live proxy server, the method may further include: receiving the channel joining indication sent by the OTT live proxy server.

Further, the method further includes: when a quantity of OTT clients in the multicast forwarding table of the multicast replication point is zero, sending a multicast leave request to the OTT live proxy server to request to leave the multicast group.

Certainly, it should be understood that, the foregoing methods may be combined and used. For example, the method may further include: authenticating, according to the media data request sent by the OTT client and the authorized subscriber list of the specified channel, permission for the OTT client to join the specified channel, and after the authentication on the OTT client succeeds, sending a request to the OTT live proxy server to request to join the multicast group.

The following further describes, with reference to specific embodiments, the methods in the embodiments shown in FIG. 2 to FIG. 4 of the present invention.

Figure 5:
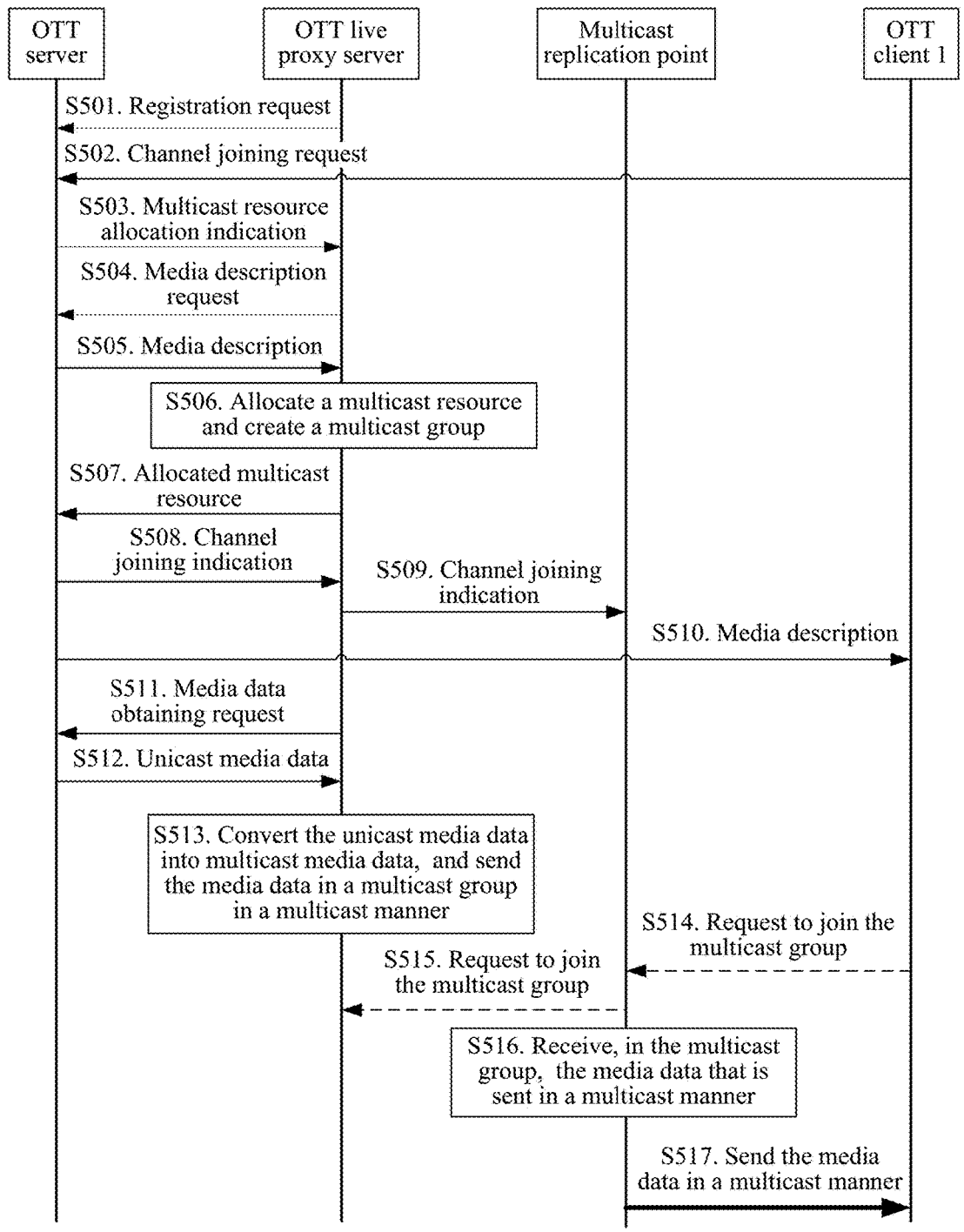
FIG. 5 is an interaction flowchart of live broadcasting media data according to an embodiment.

FIG. 5 is an interaction flowchart of live broadcasting media data according to an embodiment of the present invention. In this embodiment of the present invention, an OTT live proxy server does not allocate a multicast resource to a channel 1, and a multicast replication point does not join a multicast group of the channel 1. In a process of transmitting data from the multicast replication point to an OTT client 1, media data is transmitted in a multicast manner.

S501: The OTT live proxy server sends a registration request to an OTT server.

The OTT live proxy server sends the registration request to the OTT server. The registration request carries registration information, and is used to request to register an IP network segment of a metropolitan area network and an IP address of the OTT live proxy server.

In this embodiment of the present invention, that the metropolitan area network in which the OTT client is located includes an OTT live proxy server already registered with the OTT server is a precondition of implementing the method in the present invention.

S502: The OTT client 1 sends a channel joining request to the OTT server.

The OTT client 1 sends the channel joining request to the OTT server to request to join the channel 1.

S503: The OTT server sends a multicast resource allocation indication to the OTT live proxy server.

The OTT server obtains, according to the channel joining request sent by the OTT client 1, an IP address of the OTT client 1 and the channel 1 that the OTT client 1 is to join, to further obtain, from the registered OTT live proxy server according to the IP address, the metropolitan area network to which the IP address belongs, and obtain an OTT live proxy server corresponding to the OTT client 1 (briefly referred to as the OTT live proxy server below).

If the OTT server discovers that the OTT live proxy server does not join the channel 1, the OTT server sends the multicast resource allocation indication to the OTT live proxy server, to instruct the OTT live proxy server to allocate a multicast resource to the channel 1.

S504: The OTT live proxy server sends a media description request to the OTT server.

After receiving the multicast resource allocation indication, the OTT live proxy server sends the media description request to the OTT server, to request a media description of the channel 1.

S505: The OTT server sends a media description to the OTT live proxy server.

The OTT server returns the media description of the channel 1 according to the media description request.

Specifically, the media description may include basic information of the channel, a resolution (there may be multiple different resolutions) of the channel, a URL corresponding to a media stream of each resolution, and the like.

S506: The OTT live proxy server allocates a multicast resource and creates a multicast group.

It should be understood that, step S504 and step S505 are not necessarily executed. In an actual application, an OTT service vendor may pre-store related media descriptions of some or all channels on the OTT live proxy server, to reduce information exchange caused by the media description request.

The OTT live proxy server allocates the multicast resource to the channel 1 according to the multicast resource allocation indication of the channel 1 and the media description of the channel 1. The multicast resource of the channel 1 may include the multicast group Group1 of the channel 1, or the multicast group Group1 of the channel 1 and a port corresponding to each bitstream (or each resolution).

The OTT live proxy server may determine the multicast group Group1 by using an IP address of the multicast group Group1; or the OTT live proxy server may determine the multicast group Group1 by using an IP address of the multicast group Group1 and an IP address of a multicast source (that is, the OTT live proxy server). This embodiment of the present invention uses an example in which the multicast group Group1 is determined by using the IP address of the multicast group Group1.

Because each resolution of the channel 1 corresponds to one bitstream, the OTT live proxy server needs to allocate at least one independent port to each bitstream (or each resolution). For example, the channel 1 has two resolutions (a resolution 1 and a resolution 2), one port needs to be allocated to a bitstream corresponding to the resolution 1, and one port needs to be allocated to a bitstream corresponding to the resolution 2. Certainly, more ports may be allocated to the resolution 1 and the resolution 2.

If there is only one resolution, the OTT live proxy server can complete multicast resource allocation of the channel 1 by only determining the multicast group Group1 of the channel 1.

Alternatively, the OTT live proxy server may pre-agree with the multicast replication point or the OTT client on a port corresponding to each resolution, and does not need to configure corresponding ports for different resolutions of the channel every time.

S507: The OTT live proxy server sends the allocated multicast resource to the OTT server.

After allocating the multicast resource to the channel 1, the OTT live proxy server may send the allocated multicast resource to the OTT server.

The multicast resource may include the multicast group Group1 of the channel 1, or the multicast group Group1 of the channel 1 and the port that corresponds to the bitstream of each resolution.

S508: The OTT server sends a channel joining indication to the OTT live proxy server.

After receiving the channel joining request, the OTT server may authenticate the OTT client 1, to determine whether the OTT client 1 has permission to join the channel 1.

If the authentication on the OTT client 1 succeeds, the OTT server may send the channel joining indication to the OTT live proxy server, to notify the OTT live proxy server that the IP address of the OTT client 1 can join the multicast group Group1.

It should be understood that, the authentication operation may be performed immediately after the channel joining request is received, or may be performed after the multicast resource is allocated to the channel 1. This is not limited in this embodiment of the present invention.

S509: The OTT live proxy server sends the channel joining indication to the multicast replication point.

In this embodiment of the present invention, after receiving the channel joining indication, the OTT live proxy server may send the channel joining indication to the multicast replication point to which the OTT client 1 belongs, so that the multicast replication point to which the OTT client 1 belongs authenticates a broadcast request of the OTT client 1.

S510: The OTT server sends the media description to the OTT client 1.

The OTT server notifies the media description to the OTT client 1. The media description includes the resolution (there may be multiple different resolutions) of the channel 1, the Group1 (the IP address of the multicast group), a port that corresponds to a media stream of each resolution, and the like.

S511: The OTT live proxy server sends a media data obtaining request to the OTT server.

The OTT live proxy server sends the media data obtaining request to the OTT server to request to obtain all media data (for example, when there are multiple resolutions, media data of all resolutions needs to be obtained) of the channel 1.

S512: The OTT server sends media data to the OTT live proxy server in a unicast manner.

The OTT server sends the media data to the OTT live proxy server in a unicast manner.

It should be understood that, for processing procedures of step S511 and step S512, refer to processing procedures in the prior art that in an OTT server-OTT client mode, an OTT client requests media data and an OTT server sends the media data to the OTT client in a unicast manner, and details are not described in this embodiment of the present invention again.

S513: The OTT live proxy server converts the unicast media data into multicast media data, and sends the media data in the multicast group in a multicast manner.

After receiving the unicast media data delivered by the OTT server, the OTT live proxy server converts the unicast media data into a multicast packet.

After converting the unicast media data into the multicast packet, the OTT live proxy server sends the multicast packet in the multicast group Group1 in a multicast manner.

In this case, all multicast replication points in the multicast group Group1 can receive the multicast packet sent by the OTT live proxy server.

In an implementation manner of this embodiment of the present invention, after receiving a unicast packet, the OTT live proxy server does not immediately convert the unicast packet into a multicast packet for sending, but buffers a particular quantity of packets, and performs FEC coding. Then, the OTT live proxy server sends a media multicast packet in the multicast group and sends an FEC packet by using another port. If a particular channel has multiple bitstreams, each bitstream has a corresponding FEC packet, and each FEC packet is transmitted in the multicast group by using an independent port. After receiving the multicast packet, if the OTT client discovers that a packet loss/packet error occurs currently, the OTT client restores a correct data packet preferentially by means of FEC.

In another implementation manner of this embodiment of the present invention, after receiving a unicast packet, the OTT live proxy server adds a sequence number to the packet, to uniquely represent the packet. The sequence number may use an IP extension header or a UDP extension header. Optionally, an RTP header may be added, and an RTP sequence number is used. Optionally, a field of a particular length may be added before a payload, and is used as the sequence number. The OTT live proxy server sends multicast packets, and at the same time, buffers multicast packets in a particular time length. When the OTT client discovers that a packet loss/packet error occurs currently, the OTT client requires the OTT live proxy server to retransmit a packet of a corresponding sequence number.

One of the foregoing two manners may be used, or the foregoing two manners may be combined and used. This is not limited in this embodiment of the present invention.

Certainly, it should be understood that, the OTT live proxy server may transmit the multicast packet in another manner. This is not limited in this embodiment of the present invention.

In addition, a bitstream unicast by the OTT live proxy server is generally VBR, that is, the bitstream may change. When the bitstream changes frequently, a packet loss may easily occur. However, because OTT unicast is based on the TCP, a TCP/IP protocol stack itself may implement retransmission of a lost packet. In the solutions of the present invention, TCP-based unicast is changed into UDP-based multicast, but there is no mechanism for retransmission of a lost packet in the UDP. If it is discovered that a current unicast bitstream is volatile (for example, a change value exceeds 20% of an average bitstream), smoothing processing is performed on the bitstream. A specific method is: Buffer some packets and send the packets in a delaying manner, to avoid the rush hour.

S514: The OTT clients sends a request to the multicast replication point to request to join the multicast group.

After receiving the media description fed back in step S510, the OTT client 1 learns that the OTT client 1 needs to join the multicast group Group1 before joining an audio program or a video program of the channel 1. Therefore, the OTT client 1 sends an IGMP join Group1 message to the multicast replication point to which the OTT client 1 belongs, to request to join the multicast group Group1.

S515: The multicast replication point sends a request to the OTT live proxy server to request to join the multicast group.

After receiving the IGMP join Group1 message, the multicast replication point first authenticates the OTT client 1, to determine whether the OTT client 1 can join the audio program or the video program of the channel 1.

Because the channel joining indication in step S509 indicates that the multicast replication point allows the OTT client 1 to join the audio program or the video program of the channel 1, it indicates that authentication on the OTT client 1 succeeds.

In this case, the multicast replication point needs to determine whether the multicast replication point already joins the multicast group Group1.

In this embodiment of the present invention, the multicast replication point can determine that the multicast replication point does not join the multicast group Group1 yet. The multicast replication point needs to send a PIM join Group1 message to the OTT live proxy server to request to join the multicast group Group1.

S516: The multicast replication point receives the multicast media data in the multicast group.

After joining the multicast group Group1, the multicast replication point can receive the media data of the channel 1 that is sent by the OTT live proxy server in the multicast group Group1 in a multicast manner.

S517: The multicast replication point sends the media data to the OTT client 1 in a multicast manner.

After receiving the data of the multicast group Group1, the multicast replication point searches a multicast forwarding table record, discovering that the OTT client 1 already joins the Group1, and then, forwards a multicast media packet to the OTT client 1. In this case, the OTT client 1 can normally join the audio program or the video program of the channel 1.

In this embodiment of the present invention, an OTT server instructs, according to a channel joining request sent by an OTT client, an OTT live proxy server in a metropolitan area network to which the OTT client belongs to allocate a multicast resource, and transmits media data of a channel of the OTT server to the OTT live proxy server in a unicast manner; the OTT live proxy server sends the media data to a multicast replication point in a multicast manner; and the multicast replication point transmits the media data of the channel to the OTT client in a multicast manner. Therefore, OTT clients in one metropolitan area network can share media data resources of one channel, thereby saving a large quantity of bandwidth for the OTT server, and improving channel bandwidth resource utilization of the OTT server.

It should be understood that, different multicast protocols may be used in different metropolitan area networks. When an OTT client joins a multicast group, the OTT client may join the multicast group by using a multicast group IP address or by using a multicast group IP address and a multicast source IP address. That is, the multicast group may be represented by using the multicast group IP address, or the multicast group IP address and the multicast source IP address. In this case, the multicast group in the foregoing embodiment may be adjusted adaptively. A part involving the multicast group in the following embodiment is similar thereto, and details are not described again.

It should be understood that, in this embodiment of the present invention, in step S502 and step S503, the OTT client sends the channel joining request to the OTT server to request to join the channel 1, thereby triggering the OTT server to send the multicast resource allocation indication to the OTT live proxy server. In a specific application, the OTT client may directly send the channel joining request to the multicast replication point to request to join the channel 1, and the multicast replication point sends the multicast resource allocation indication to the OTT live proxy server to instruct the OTT live proxy server to allocate the multicast resource to the channel 1. The other steps are similar to the steps in this embodiment of the present invention, and details are not described in this embodiment of the present invention again.

Figure 6:
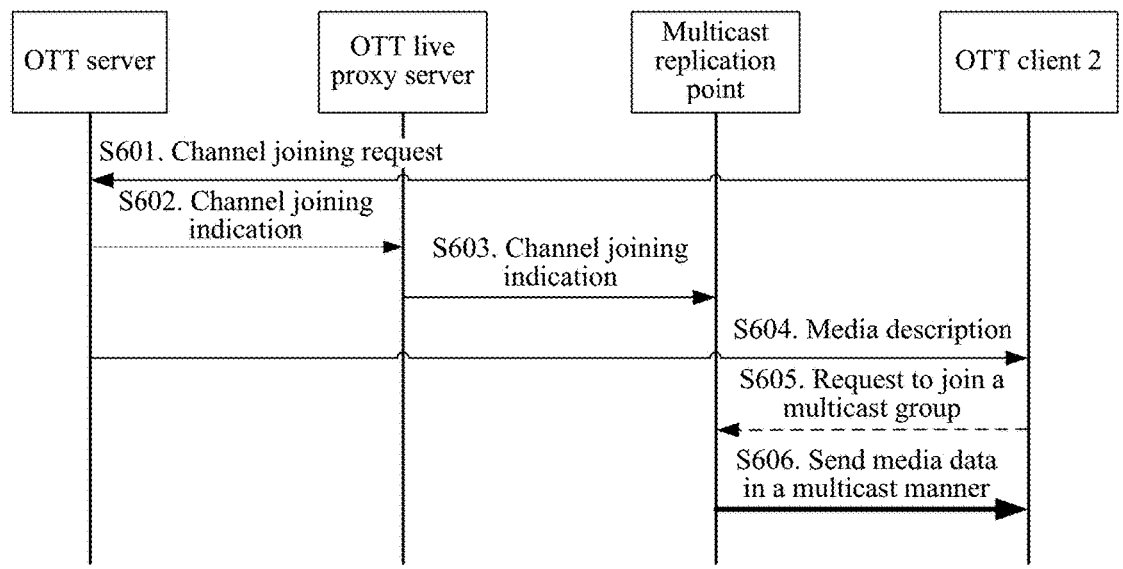
FIG. 6 is another interaction flowchart of live broadcasting media data according to an embodiment.

FIG. 6 is an interaction flowchart of live broadcasting media data according to an embodiment of the present invention. In this embodiment of the present invention, an OTT live proxy server already allocates a multicast resource to a channel 1, and a multicast replication point already joins a multicast group of the channel 1. In a process of transmitting data from the multicast replication point to an OTT client 2, media data is transmitted in a multicast manner.

S601: The OTT client 2 sends a channel joining request to an OTT server.

The OTT client 2 sends the channel joining request to the OTT server to request to join the channel 1.

S602: The OTT server sends a channel joining indication to the OTT live proxy server.

After receiving the channel joining request, the OTT server may authenticate the OTT client 2, to determine whether the OTT client 2 has permission to join the channel 1.

In addition, the OTT server determines, according to the channel joining request of the OTT client 2, the OTT live proxy server in a metropolitan area network in which the OTT client 2 is located, to further learn that the OTT live proxy server already allocates the multicast resource to the channel 1.

If the authentication on the OTT client 2 succeeds, the OTT server may send the channel joining indication to the OTT live proxy server, to notify the OTT live proxy server that an IP address of the OTT client 2 may join the multicast group Group1.

S603: The OTT live proxy server sends the channel joining indication to the multicast replication point.

In this embodiment of the present invention, after receiving the channel joining indication, the OTT live proxy server may send the channel joining indication to the multicast replication point to which the OTT client 2 belongs, so that the multicast replication point to which the OTT client 2 belongs authenticates a broadcast request of the OTT client 2.

S604: The OTT server sends a media description to the OTT client 2.

The OTT server notifies the media description to the OTT client 2. The media description includes a resolution (there may be multiple different resolutions) of the channel 1, the Group1 (an IP address of the multicast group), a port that corresponds to a media stream of each resolution, and the like.

S605: The OTT client sends a request to the multicast replication point to request to join a multicast group.

After receiving the media description fed back in step S604, the OTT client 2 learns that the OTT client 2 needs to join the multicast group Group1 before joining an audio program or a video program of the channel 1. Therefore, the OTT client 2 sends an IGMP join Group1 message to the multicast replication point to which the OTT client 2 belongs, to request to join the multicast group Group1.

S606: The multicast replication point sends media data to the OTT client 2 in a multicast manner.

In addition, in this embodiment of the present invention, the multicast replication point already joins the multicast group Group1, and receives the multicast media data in the multicast group.

After receiving the IGMP join Group1 message, the multicast replication point first authenticates the OTT client 2, to determine whether the OTT client 2 can join the audio program or the video program of the channel 1. Because the channel joining indication in step S603 indicates that the multicast replication point allows the OTT client 2 to join the audio program or the video program of the channel 1, it indicates that the authentication on the OTT client 2 succeeds.

In this case, the multicast replication point may forward a multicast media packet to the OTT client 2, and the OTT client 2 can normally join the audio program or the video program of the channel 1.

Figure 7:
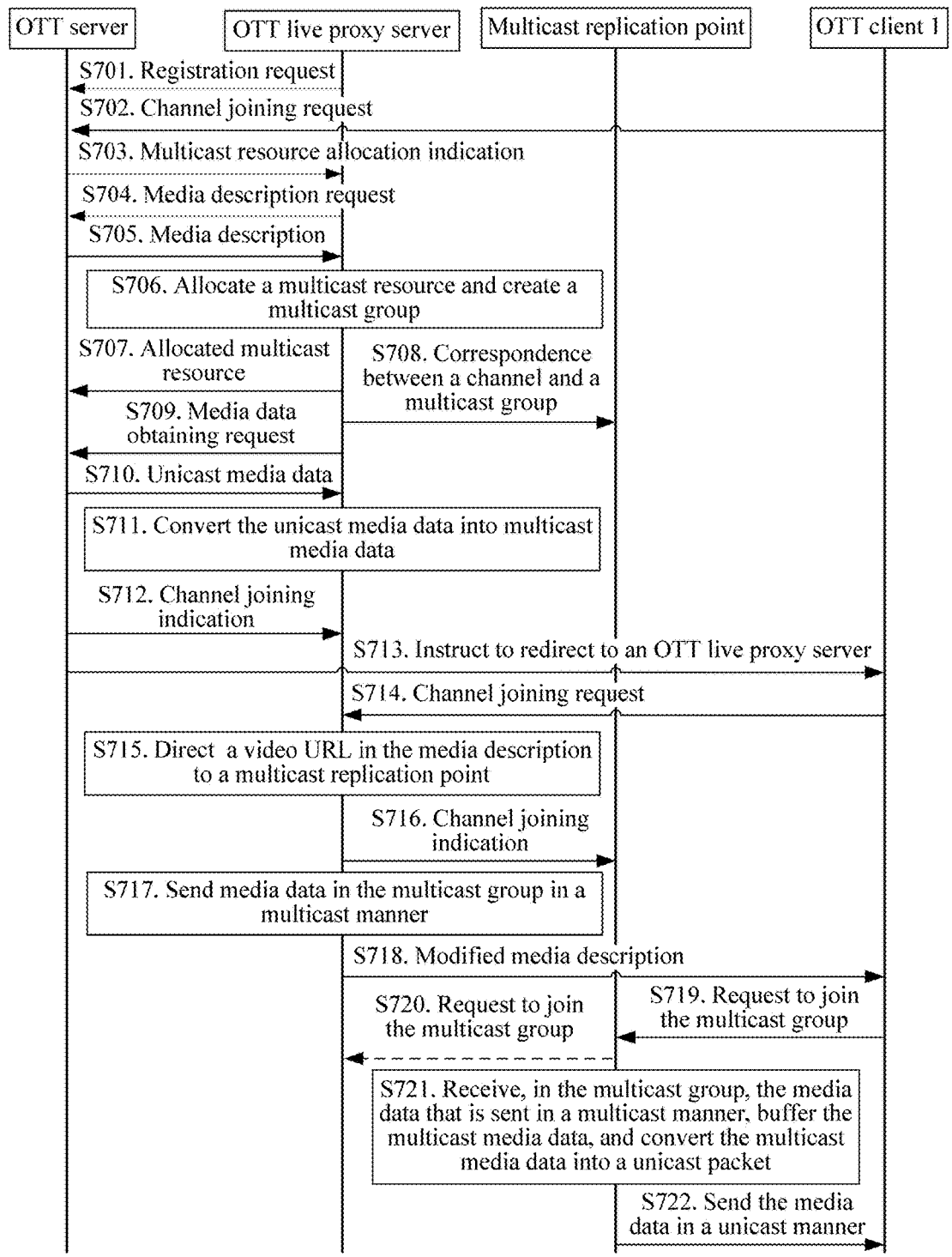
FIG. 7 is a still another interaction flowchart of live broadcasting media data according to an embodiment.

FIG. 7 is an interaction flowchart of live broadcasting media data according to an embodiment of the present invention. In this embodiment of the present invention, an OTT live proxy server does not allocate a multicast resource to a channel 1, and a multicast replication point does not join a multicast group of the channel 1. In a process of transmitting data from the multicast replication point to an OTT client 1, media data is transmitted in a unicast manner.

S701: The OTT live proxy server sends a registration request to an OTT server.

S702: The OTT client 1 sends a channel joining request to the OTT server.

S703: The OTT server sends a multicast resource allocation indication to the OTT live proxy server.

S704: The OTT live proxy server sends a media description request to the OTT server.

S705: The OTT server sends a media description to the OTT live proxy server.

S706: The OTT live proxy server allocates a multicast resource and creates a multicast group.

For specific implementation of step S701 to step S706, refer to step S501 to step S506 in FIG. 5, and details are not described in this embodiment of the present invention again.

S707: The OTT live proxy server sends the allocated multicast resource to the OTT server.

After allocating the multicast resource (a multicast group Group1 of the channel 1, or a multicast group Group1 of the channel 1 and a port that corresponds to a bitstream of each resolution) to the channel 1, the OTT live proxy server may send the allocated multicast resource to the OTT server.

S708: The OTT live proxy server sends a correspondence between a channel and a multicast group to the multicast replication point.

The OTT live proxy server sends the correspondence between a channel and a multicast group to the multicast replication point. In this way, when receiving the request of the OTT client for joining the channel 1, the multicast replication point may know a multicast IP address to which the OTT client wants to join.

S709: The OTT live proxy server sends a media data obtaining request to the OTT server.

The OTT live proxy server sends the media data obtaining request to the OTT server to request to obtain all media data (for example, when there are multiple resolutions, media data of all resolutions needs to be obtained) of the channel 1.

S710: The OTT server sends media data to the OTT live proxy server in a unicast manner.

The OTT server sends the media data to the OTT live proxy server in a unicast manner.

It should be understood that, for processing procedures of step S709 and step S710, refer to processing procedures in the prior art that in an OTT server-OTT client mode, an OTT client requests media data and an OTT server sends the media data to the OTT client in a unicast manner, and details are not described in this embodiment of the present invention.

S711: The OTT live proxy server converts the unicast media data into multicast media data.

For specific implementation of step S711, refer to step S513 in FIG. 5, and details are not described in this embodiment of the present invention again.

S712: The OTT server sends a channel joining indication to the OTT live proxy server.

For specific implementation of step S712, refer to step S508 in FIG. 5, and details are not described in this embodiment of the present invention again.

S713: The OTT server instructs the OTT client 1 to redirect to the OTT live proxy server.

The OTT server sends a redirection command to the OTT client 1, to require the OTT client 1 to obtain the media description from the OTT live proxy server. The command includes an IP address of the OTT live proxy server.

S714: The OTT client 1 sends a channel joining request to the OTT live proxy server.

After receiving a redirection command, the OTT client 1 sends the channel joining request to the OTT live proxy server to request to join the channel 1.

S715: The OTT live proxy server directs a video URL in the media description to the multicast replication point.

The OTT live proxy server changes, according to the media description downloaded in step S705, the video URL into an IP address of the multicast replication point to which the OTT client 1 belongs.

S716: The OTT live proxy server sends the channel joining indication to the multicast replication point.

In this embodiment of the present invention, after receiving the channel joining indication, the OTT live proxy server may send the channel joining indication to the multicast replication point to which the OTT client 1 belongs, so that the multicast replication point to which the OTT client 1 belongs authenticates a broadcast request of the OTT client 1.

S717: The OTT live proxy server sends the media data in the multicast group in a multicast manner.

For specific implementation of step S717, refer to step S513 in FIG. 5, and details are not described in this embodiment of the present invention again.

S718: The OTT live proxy server sends a modified media description to the OTT client 1.

The OTT live proxy server sends the media description of the channel 1 to the OTT client 1, and the video URL is already changed into the IP address of the multicast replication point to which the OTT client 1 belongs.

S719: The OTT client 1 sends a media data obtaining request to the multicast replication point.

The OTT client 1 sends, according to the video URL in the media description, a request to the multicast replication point to which the OTT client belongs, to request to join the multicast group.

S720: The multicast replication point sends a request to the OTT live proxy server to request to join the multicast group.

The multicast replication point learns, according to the request, that the OTT client 1 wants to join a video of the channel 1, determines that the OTT client 1 is allowed to join the channel 1, and further finds, through searching, the multicast group Group1 corresponding to the channel 1.

Because the multicast replication point currently does not join the Group1 yet, the multicast replication point may send a PIM join Group1 message, to request to join the multicast group Group1.

S721: The multicast replication point receives the multicast media data in the multicast group, buffers the multicast media data, and converts the multicast media data into unicast media data.

After joining the multicast group Group1 successfully, the multicast replication point receives the multicast media data delivered by the multicast group Group1.

The multicast replication point buffers the multicast media data and converts the multicast media data into the unicast media data.

S722: The multicast replication point sends the media data to the OTT client 1 in a unicast manner.

In this case, the OTT client 1 may join a video of the channel 1.

Figure 8:
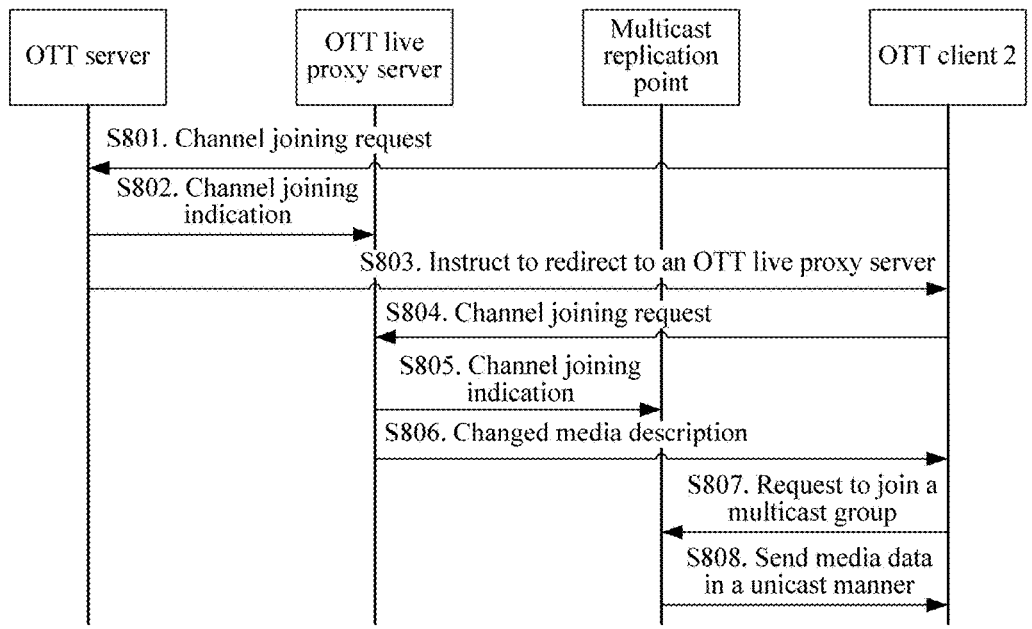
FIG. 8 is a yet another interaction flowchart of live broadcasting media data according to an embodiment.

FIG. 8 is an interaction flowchart of live broadcasting media data according to an embodiment of the present invention. In this embodiment of the present invention, an OTT live proxy server already allocates a multicast resource to a channel 1, and a multicast replication point already joins a multicast group of the channel 1. In a process of transmitting data from the multicast replication point to an OTT client 2, media data is transmitted in a unicast manner.

S801: The OTT client 2 sends a channel joining request to an OTT server.

The OTT client 2 sends the channel joining request to the OTT server to request to join the channel 1.

S802: The OTT server sends a channel joining indication to the OTT live proxy server.

After receiving the channel joining request, the OTT server may authenticate the OTT client 2, to determine whether the OTT client 2 has permission to join the channel 1.

In addition, the OTT server determines, according to the channel joining request of the OTT client 2, the OTT live proxy server in a metropolitan area network in which the OTT client 2 is located, to further learn that the OTT live proxy server already allocates the multicast resource to the channel 1.

If the authentication on the OTT client 2 succeeds, the OTT server may send the channel joining indication to the OTT live proxy server, to notify the OTT live proxy server that an IP address of the OTT client 2 may join the multicast group Group1.

S803: The OTT server instructs the OTT client 2 to redirect to the OTT live proxy server.

The OTT server sends a redirection command to the OTT client 2, to require the OTT client 2 to obtain a media description from the OTT live proxy server. The command includes an IP address of the OTT live proxy server.

S804: The OTT client 2 sends a channel joining request to the OTT live proxy server.

After receiving the redirection command, the OTT client 2 sends the channel joining request to the OTT live proxy server to request to join the channel 1.

S805: The OTT live proxy server sends the channel joining indication to the multicast replication point.

In this embodiment of the present invention, after receiving the channel joining indication, the OTT live proxy server may send the channel joining indication to the multicast replication point to which the OTT client 2 belongs, so that the multicast replication point to which the OTT client 2 belongs authenticates a broadcast request of the OTT client 2.

S806: The OTT live proxy server sends a modified media description to the OTT client 2.

The OTT live proxy server changes, according to the media description of the channel 1, a video URL into an IP address of the multicast replication point to which the OTT client 2 belongs.

The OTT live proxy server sends the media description of the channel 1 to the OTT client 2, and the video URL is already changed into the IP address of the multicast replication point to which the OTT client 2 belongs.

S807: The OTT client 2 sends a request to the multicast replication point to request to join the multicast group.

The OTT client 2 sends, according to the video URL in the media description, a request to the multicast replication point to which the OTT client 2 belongs, to request to download media data.

S808: The multicast replication point sends media data to the OTT client 2 in a unicast manner.

In this embodiment of the present invention, the multicast replication point already joins the multicast group. In this case, the multicast replication point receives the multicast media data in the multicast group, buffers the multicast media data, and converts the multicast media data into a unicast packet.

The multicast replication point may send the media data to the OTT client 2 in a unicast manner according to the media data obtaining request of the OTT client 2.

In this case, the OTT client 2 may join a video of the channel 1.

Figure 9:
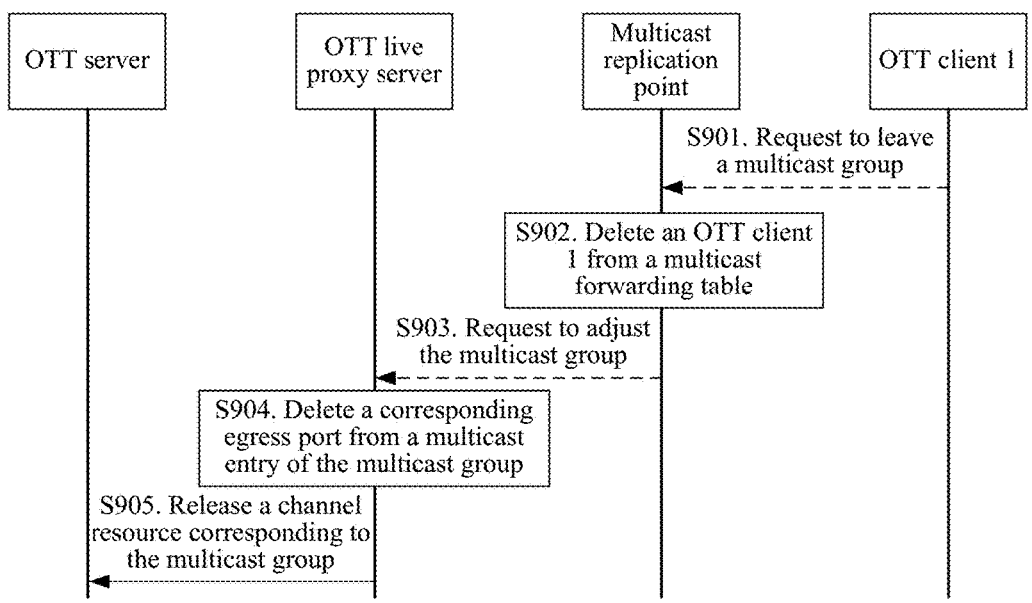
FIG. 9 is a still yet another interaction flowchart of live broadcasting media data according to an embodiment.

FIG. 9 is an interaction flowchart of live broadcasting media data according to an embodiment of the present invention. In this embodiment of the present invention, an OTT client 1 already joins a video program of a channel 1 by using a multicast replication point.

S901: The OTT client 1 sends a request to the multicast replication point to request to leave a multicast group.

When the OTT client 1 no longer joins the channel 1, the OTT client 1 may send an IGMP leave Group1 message to an upstream device (the multicast replication point) to request to leave the multicast group Group1.

S902: The multicast replication point deletes the OTT client 1 from a multicast forwarding table.

After receiving the IGMP leave Group1 message of the OTT client, the multicast replication point deletes the OTT client from the multicast forwarding table of the Group1.

S903: The multicast replication point sends a request to the OTT live proxy server to request to adjust the multicast group.

If the multicast replication point discovers that there is no OTT client in the multicast forwarding table of the Group1, the multicast replication point deletes the multicast entry, and sends the IGMP leave Group1 message to an upstream device (the OTT live proxy server) to request to adjust the multicast group.

S904: The OTT live proxy server deletes a corresponding egress port from a multicast forwarding entry of the multicast group.

After receiving an IGMP leave Group1 message sent by a particular downstream port, the OTT live proxy server deletes, from the multicast forwarding entry of the Group1, an egress port corresponding to the downstream port.

S905: The OTT live proxy server releases a channel resource corresponding to the multicast group.

In this embodiment of the present invention, the multicast group corresponds to the channel 1.

If there is no egress port in the multicast entry of the multicast group, it indicates that no user joins the channel 1 in a metropolitan area network.

In this case, the OTT live proxy server may delete the multicast entry of the Group1, disconnect a connection for downloading media data by the channel 1 from the OTT server, release a multicast resource allocated to the channel 1, and at the same time, notify the OTT server.

In this embodiment of the present invention, a resource is recycled to reduce load of a multicast replication point, an OTT live proxy server, or an OTT server, and to improve resource utilization efficiency.

Figure 10:
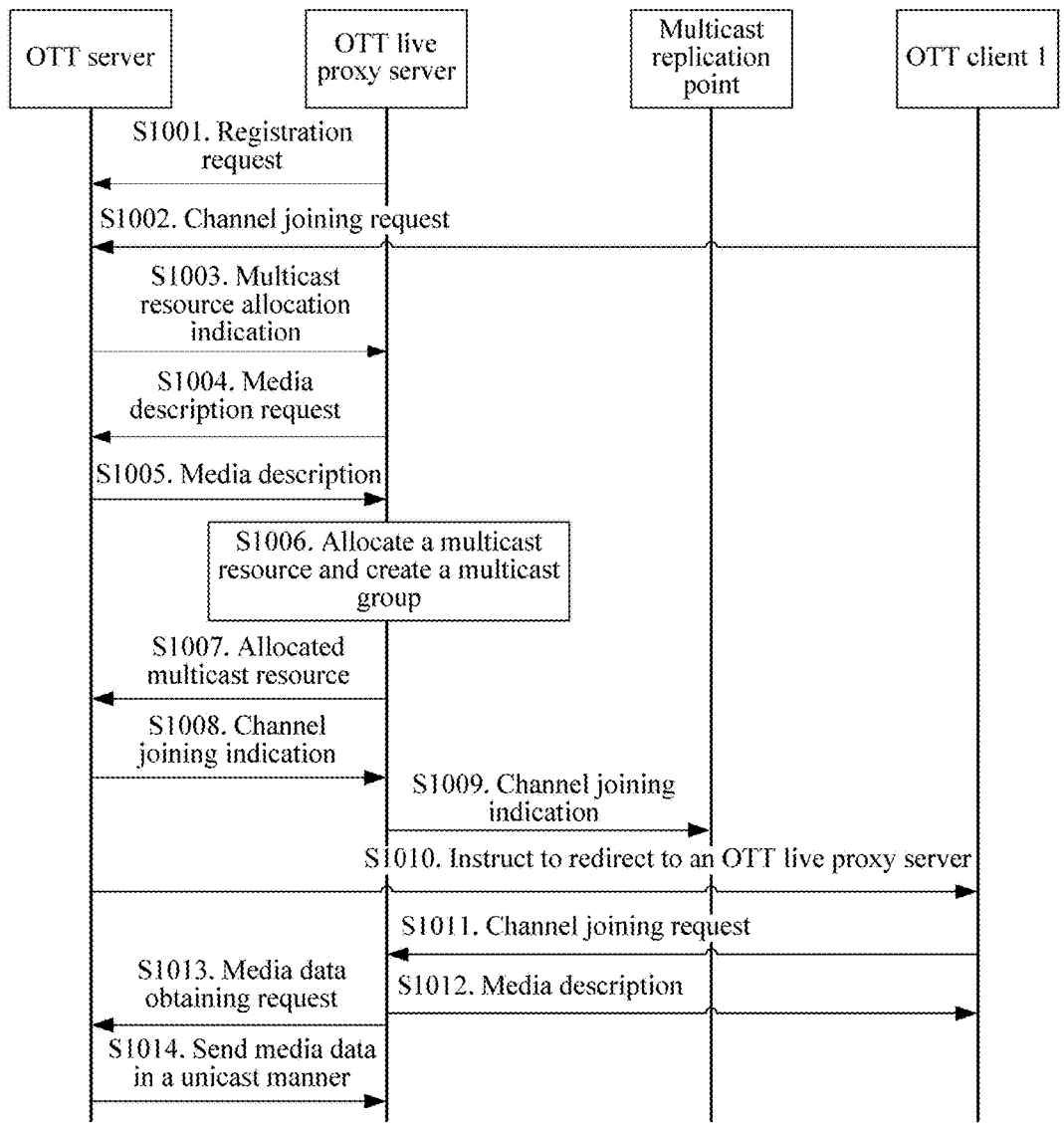
FIG. 10 is a further interaction flowchart of live broadcasting media data according to an embodiment.

FIG. 10 is an interaction flowchart of live broadcasting media data according to an embodiment of the present invention. In this embodiment of the present invention, an OTT live proxy server does not allocate a multicast resource to a channel 1, and a multicast replication point does not join a multicast group of the channel 1. In a process of transmitting data from the multicast replication point to an OTT clients, media data is transmitted in a multicast manner.

S1001: The OTT live proxy server sends a registration request to an OTT server.

S1002: The OTT client 1 sends a channel joining request to the OTT server.

S1003: The OTT server sends a multicast resource allocation indication to the OTT live proxy server.

S1004: The OTT live proxy server sends a media description request to the OTT server.

S1005: The OTT server sends a media description to the OTT live proxy server.

S1006: The OTT live proxy server allocates a multicast resource and creates a multicast group.

S1007: The OTT live proxy server sends the allocated multicast resource to the OTT server.

S1008: The OTT server sends a channel joining indication to the OTT live proxy server.

S1009: The OTT live proxy server sends the channel joining indication to the multicast replication point.

For specific implementation of step S1001 to step S1009, refer to step S501 to step S505 in FIG. 5, and details are not described in this embodiment of the present invention again.

S1010: The OTT server instructs the OTT client 1 to redirect to the OTT live proxy server.

The OTT server sends a redirection command to the OTT client 1, to require the OTT client 1 to obtain the media description from the OTT live proxy server. The command includes an IP address of the OTT live proxy server.

S1011: The OTT client 1 sends a channel joining request to the OTT live proxy server.

After receiving the redirection command, the OTT client 1 sends the channel joining request to the OTT live proxy server to request to join the channel 1.

S1012: The OTT live proxy server sends a modified media description to the OTT client 1.

The OTT live proxy server changes, according to the media description downloaded in step S1005, a video URL into an IP address of the multicast replication point to which the OTT client 1 belongs.

The OTT live proxy server sends the media description of the channel 1 to the OTT client 1, and the video URL is already changed into the IP address of the multicast replication point to which the OTT client 1 belongs.

S1013: The OTT server sends the media description to the OTT client 1.

S1014: The OTT live proxy server sends a media data obtaining request to the OTT server.

For specific implementation of step S1013 and step S1014, refer to step S510 and step S511 in FIG. 5, and details are not described in this embodiment of the present invention again.

Figure 11:
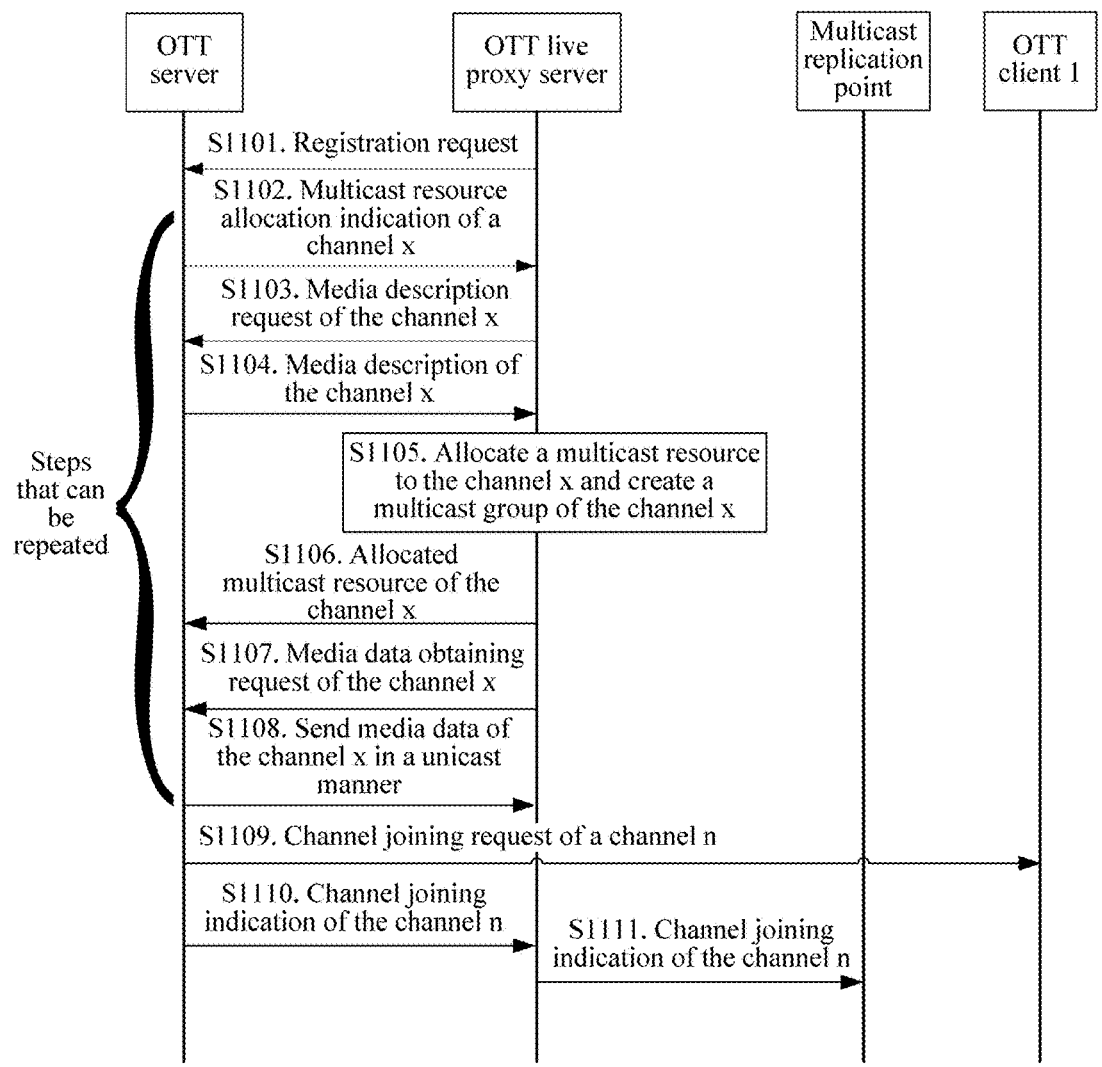
FIG. 11 is a still further interaction flowchart of live broadcasting media data according to an embodiment.

FIG. 11 is an interaction flowchart of live broadcasting media data according to an embodiment of the present invention.

S1101: An OTT live proxy server sends a registration request to an OTT server.

The OTT live proxy server sends the registration request to the OTT server to request to register an IP network segment of a metropolitan area network in which the OTT live proxy server is located and an IP address of the OTT live proxy server.

S1102: The OTT server sends a multicast resource allocation indication of a channel x to the OTT live proxy server.

S1103: The OTT live proxy server sends a media description request of the channel x to the OTT server.

S1104: The OTT server sends a media description of the channel x to the OTT live proxy server.

S1105: The OTT live proxy server allocates a multicast resource to the channel x and creates a multicast group Groupx of the channel x.

S1106: The OTT live proxy server sends the allocated multicast resource of the channel x to the OTT server.

S1107: The OTT live proxy server sends a media data obtaining request of the channel x to the OTT server.

S1108: The OTT server sends media data of the channel x to the OTT live proxy server in a unicast manner.

For specific implementation of step S1102 to step S1108, refer to step S502 to step S506 and step S511 and step S512 in FIG. 5, and details are not described in this embodiment of the present invention again.

In addition, it should be understood that, in this embodiment of the present invention, step S1102 to step S1108 may be performed repeatedly. That is, the OTT server may instruct the OTT live proxy server to create a multicast resource for multiple channels.

S1109: An OTT client 1 sends a request for joining a channel n to the OTT server.

The OTT client 1 sends the request for joining the channel n to the OTT server to request to join the channel n.

S1110: The OTT server sends a channel joining indication of the channel n to the OTT live proxy server.

The OTT server authenticates the OTT client 1 according to the request for joining the channel n. If the OTT client 1 is allowed to join the channel n, and the OTT live proxy server in the metropolitan area network in which the OTT client 1 is located already allocates a multicast resource (the multicast group Groupn) to the channel n, the OTT server may send the channel joining indication to the OTT live proxy server, to notify the OTT live proxy server that an IP address of the OTT client 1 may join the multicast group Groupn.

S1111: The OTT live proxy server sends the channel joining indication of the channel n to the multicast replication point.

After receiving the channel joining indication, the OTT live proxy server may send the channel joining indication to the multicast replication point to which the OTT client 1 belongs, so that the multicast replication point to which the OTT client 1 belongs authenticates a broadcast request of the OTT client 1.

The following operations may be similar to those in the embodiment shown in FIG. 5 or FIG. 7, and details are not described in this embodiment of the present invention again.

Figure 12:
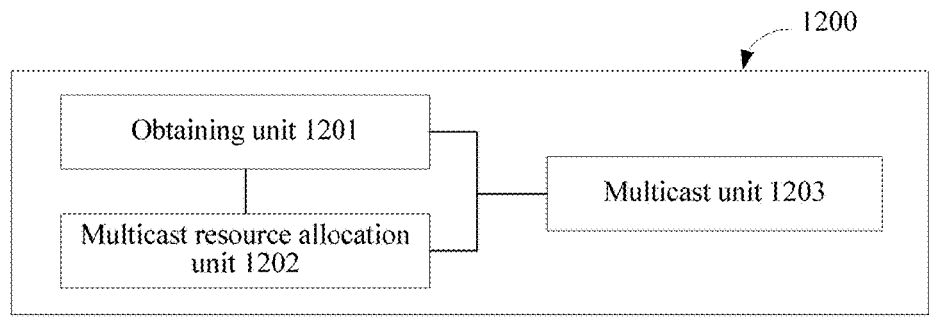
FIG. 12 is a schematic structural diagram of an OTT live proxy server according to an embodiment.

FIG. 12 is a schematic structural diagram of an OTT live proxy server 1200 according to an embodiment of the present invention. As shown in FIG. 12, the OTT live proxy server 1200 may include: an obtaining unit 1201, a multicast resource allocation unit 1202, and a multicast unit 1203.

The multicast resource allocation unit 1202 is configured to allocate a multicast resource to a specified channel according to a multicast resource allocation indication of the specified channel and a media description of the specified channel.

The multicast resource allocation indication is used to instruct the OTT live proxy server to allocate the multicast resource to the specified channel. The media description of the specified channel includes at least one resolution of the specified channel and a uniform resource locator (URL) corresponding to media data of the at least one resolution. The multicast resource includes a multicast group corresponding to the specified channel, or a multicast group corresponding to the specified channel and a port corresponding to the at least one resolution.

The obtaining unit 1201 is configured to obtain, from an OTT server to which the specified channel belongs and in a unicast manner according to the media description of the specified channel, the media data corresponding to the at least one resolution.

The multicast unit 1203 is configured to: convert the media data corresponding to the at least one resolution into multicast media data, and send, in a multicast manner, the multicast media data to a multicast replication point that already joins the multicast group.

In this embodiment of the present invention, the OTT live proxy server 1200 allocates a multicast resource of a channel according to a channel allocation indication of an OTT server, obtains media data of the channel from the OTT server, and sends, in a multicast manner, the media data of the channel to a multicast group corresponding to the channel, so that a multicast replication point in the multicast group can transmit the media data of the channel to an OTT client joining the channel. In this way, a large quantity of repeated live streams can be avoided from passing through a backbone network, thereby greatly reducing a quantity of repeated packets transmitted from the OTT server to a metropolitan area network, and reducing bandwidth of a bearer network occupied by live media data.

Optionally, the OTT live proxy server may further include: a receiving unit, configured to receive the multicast resource allocation indication. The multicast resource allocation indication is sent by an OTT server of the OTT live proxy server, or the multicast resource allocation indication is sent by a multicast replication point in a metropolitan area network in which the OTT live proxy server is located.

Figure 13:
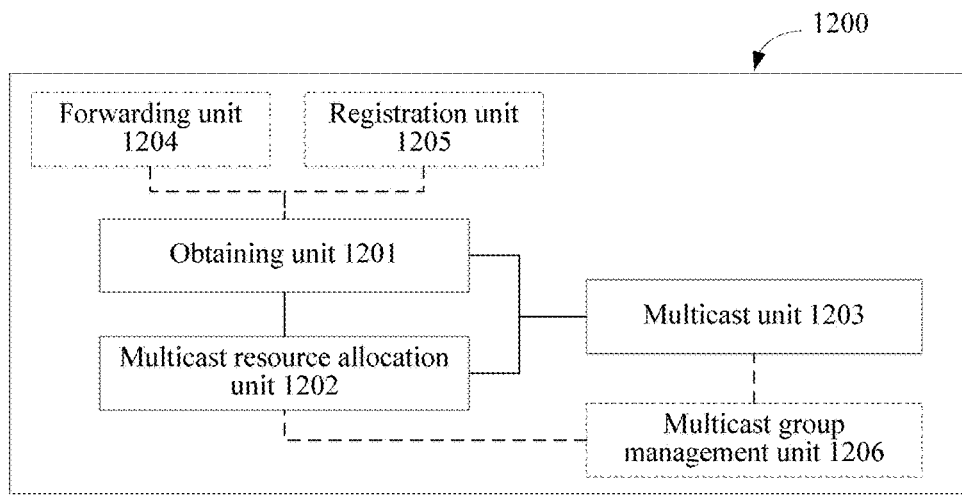
FIG. 13 is another schematic structural diagram of an OTT live proxy server according to an embodiment.

FIG. 13 is another schematic structural diagram of the OTT live proxy server 1200 according to an embodiment of the present invention.

Optionally, in an embodiment, the obtaining unit 1201 is further configured to obtain the media description of the specified channel from the OTT server.

Optionally, in another embodiment, the media description of the specified channel is pre-stored on the OTT live proxy server. An OTT service vendor may pre-store related media descriptions of some or all channels on the OTT live proxy server, to reduce information exchange caused by a media description request.

Optionally, as shown in FIG. 13, the OTT live proxy server 1200 may further include: a forwarding unit 1204, configured to: receive a channel joining indication sent by the OTT server, and send the channel joining indication to a multicast replication point in a metropolitan area network in which the OTT live proxy server is located, so that the multicast replication point adds an OTT client to an authorized subscriber list of the specified channel, where the channel joining indication is used to indicate that the OTT client is allowed to join the specified channel.

Optionally, as shown in FIG. 13, the OTT live proxy server 1200 may further include: a registration unit 1205, configured to register, with the OTT server, an Internet Protocol (IP) network segment of the metropolitan area network in which the OTT live proxy server is located and an IP address of the OTT live proxy server.

Optionally, in an embodiment, the multicast resource allocation unit 1202 is further configured to feed back the allocated multicast resource to the OTT server, so that the OTT server sends the multicast resource to the OTT client, and the OTT client can join the multicast group.

Optionally, in another embodiment, the multicast resource allocation unit 1202 is further configured to send a correspondence between the specified channel and the multicast group of the specified channel to the multicast replication point in the metropolitan area network in which the OTT live proxy server is located, so that the multicast replication point determines, according to a request sent by the OTT client for joining the specified channel, the multicast group corresponding to the specified channel.

Further, the multicast resource allocation unit 1202 is further configured to send the multicast resource to the OTT client according to the request sent by the OTT client for joining the specified channel, so that the OTT client requests the media data of the specified channel from the multicast replication point.

Optionally, as shown in FIG. 13, the OTT live proxy server 1200 may further include: a multicast group management unit 1206, configured to add the multicast replication point to the multicast group according to a multicast joining request of the multicast replication point, and add an egress port corresponding to the multicast replication point to a multicast forwarding entry of the multicast group, or delete the multicast replication point from the multicast group according to a multicast leave request of the multicast replication point, and delete an egress port corresponding to the multicast replication point from a multicast forwarding entry of the multicast group.

Further, the multicast group management unit 1206 is further configured to: when a quantity of egress ports in the multicast forwarding entry of the multicast group is zero, delete the multicast forwarding entry of the multicast group, and disconnect a link for downloading the media data of the specified channel from the OTT server.

In addition, the OTT live proxy server 1200 may further execute the method in FIG. 2, and implement functions of the OTT live proxy server in the embodiments shown in FIG. 5 to FIG. 11, and details are not described in this embodiment of the present invention again.

Figure 14:
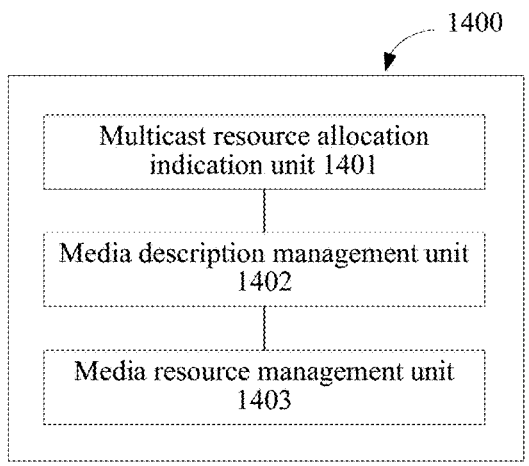
FIG. 14 is a schematic structural diagram of an OTT server according to an embodiment.

FIG. 14 is a schematic structural diagram of an OTT server 1400 according to an embodiment of the present invention. The OTT server 1400 may include a multicast resource allocation indication unit 1401, a media description management unit 1402, and a media resource management unit 1403.

The multicast resource allocation indication unit 1401 is configured to send a multicast resource allocation indication to an OTT live proxy server registered with the OTT server 1400. The multicast resource allocation indication is used to instruct the OTT live proxy server to allocate a multicast resource to a specified channel.

The media description management unit 1402 is configured to send a media description of the specified channel to the OTT live proxy server according to a request sent by the OTT live proxy server for obtaining the media description of the specified channel. The media description of the specified channel includes at least one resolution of the specified channel and a URL corresponding to media data of the at least one resolution.

The media resource management unit 1403 is configured to send the media data of the at least one resolution of the specified channel to the OTT live proxy server in a unicast manner according to a request of the OTT live proxy server for obtaining the media data of the specified channel.

In this embodiment of the present invention, the OTT server 1400 instructs an OTT live proxy server to create a multicast group and allocate a multicast resource of a channel, and sends media data of the channel to the OTT live proxy server in a unicast manner, so that the OTT live proxy server sends, by using a multicast replication point, the media data of the channel to an OTT client joining the multicast group. In this way, a large quantity of repeated live streams can be avoided from passing through a backbone network, thereby greatly reducing a quantity of repeated packets transmitted from the OTT server to a metropolitan area network, and reducing bandwidth of a bearer network occupied by live media data.

Figure 15:
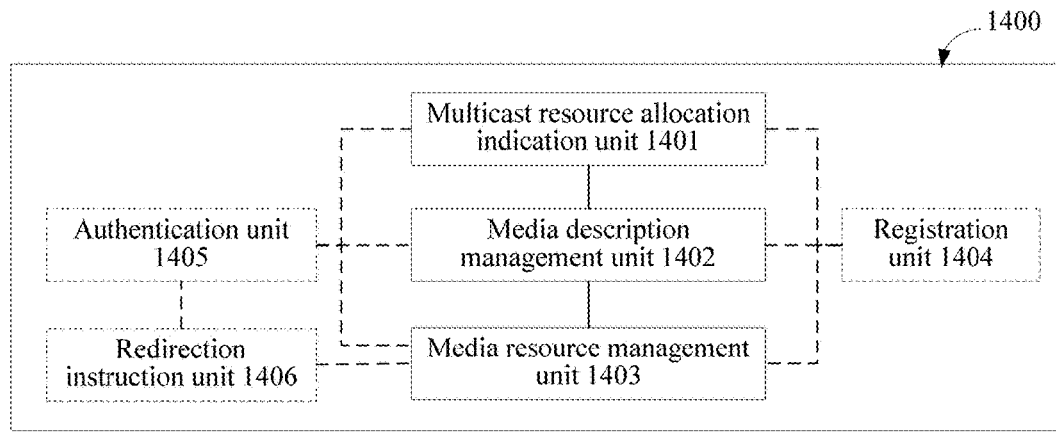
FIG. 15 is another schematic structural diagram of an OTT server according to an embodiment.

FIG. 15 is another schematic structural diagram of the OTT server 1400 according to an embodiment of the present invention.

Optionally, as shown in FIG. 15, the OTT server 1400 may further include: a registration unit 1404, configured to record an Internet Protocol (IP) network segment of a metropolitan area network in which the OTT live proxy server is located and an IP address of the OTT live proxy server according to a registration request sent by the OTT live proxy server. The registration request carries the IP network segment of the metropolitan area network in which the OTT live proxy server is located and the IP address of the OTT live proxy server.

Optionally, as shown in FIG. 15, the OTT server 1400 may further include: an authentication unit 1405, configured to determine, according to a request for joining the specified channel by an OTT client in the metropolitan area network in which the OTT live proxy server is located, whether to allow the OTT client to join the specified channel. The multicast resource allocation indication unit 1401 is specifically configured to: after the authentication unit 1405 determines to allow the OTT client to join the specified channel, and when the multicast resource of the specified channel sent by the OTT live proxy server does not exist in the OTT server, send the multicast resource allocation indication to the OTT live proxy server.

Further, in an embodiment, the authentication unit 1405 is further configured to: after allowing the OTT client to join the specified channel, send a channel joining indication to the OTT live proxy server. The channel joining indication is used to notify the OTT live proxy server that the OTT client is allowed to join the specified channel.

Alternatively, further, in another embodiment, the authentication unit 1405 is further configured to send, to the OTT client, the multicast resource that is fed back by the OTT live proxy server and that is allocated to the specified channel, so that the OTT client requests the media data of the specified channel from the multicast replication point. The multicast resource includes a multicast group corresponding to the specified channel and a port corresponding to the at least one resolution of the specified channel.

Optionally, as shown in FIG. 15, the OTT server 1400 may further include: a redirection instruction unit 1406, configured to instruct, according to a request of the OTT client for joining the specified channel and the multicast resource of the specified channel, the OTT client to redirect the request for joining the specified channel to the OTT live proxy server.

In addition, the OTT server 1400 may further execute the method in FIG. 3, and implement functions of the OTT server in the embodiments shown in FIG. 5 to FIG. 11, and details are not described in this embodiment of the present invention again.

Figure 16:
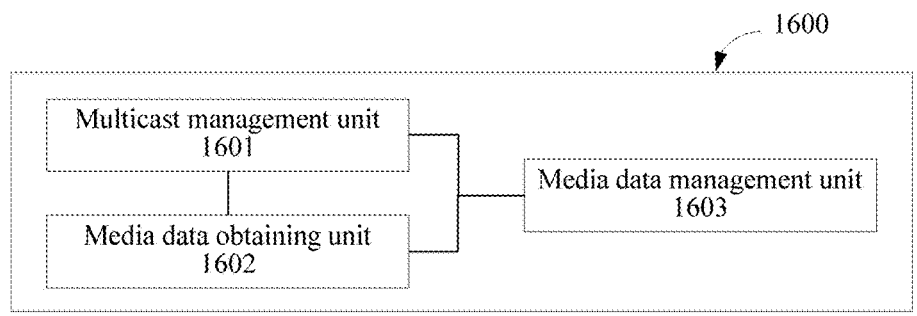
FIG. 16 is a schematic structural diagram of a multicast replication point according to an embodiment.

FIG. 16 is a schematic structural diagram of a multicast replication point 1600 according to an embodiment of the present invention. The multicast replication point 1600 may include a multicast management unit 1601, a media data obtaining unit 1602, and a media data management unit 1603.

The multicast management unit 1601 is configured to send a request to an OTT live proxy server in a metropolitan area network in which the multicast replication point is located, to request to join a multicast group that is allocated by the OTT live proxy server to a specified channel.

The media data obtaining unit 1602 is configured to receive media data of the specified channel that is sent by the OTT live proxy server in a multicast manner.

The media data management unit 1603 is configured to send the media data of the specified channel to an OTT client in a multicast or unicast manner.

In this embodiment of the present invention, the multicast replication point 1600 obtains media data of a channel from a multicast group created by an OTT live proxy server and sends the media data to an OTT client, so that the OTT client does not need to directly obtain the media data of the channel from an OTT server. In this way, a large quantity of repeated live streams can be avoided from passing through a backbone network, thereby greatly reducing a quantity of repeated packets transmitted from the OTT server to a metropolitan area network, and reducing bandwidth of a bearer network occupied by live media data.

Optionally, the multicast replication point 1600 may further include: a permission management unit 1604, configured to add the OTT client to an authorized subscriber list of the specified channel according to a channel joining indication sent by the OTT live proxy server in the metropolitan area network. The channel joining indication is used to indicate that the OTT client is allowed to join the specified channel.

Optionally, the multicast management unit 1601 is further configured to: add the OTT client to a multicast forwarding table of the multicast replication point according to a multicast joining request for joining the specified channel or a media data request, and send a request to the OTT live proxy server to request to join the multicast group, where the multicast joining request for joining the specified channel or the media data request is sent by the OTT client; or delete the OTT client from a multicast forwarding table of the multicast replication point according to a request sent by the OTT client for leaving the specified channel.

Further, the multicast management unit 1601 is further configured to: when a quantity of OTT clients in the multicast forwarding table of the multicast replication point is zero, send a multicast leave request to the OTT live proxy server to request to leave the multicast group.

Optionally, the multicast management unit 1601 is further configured to: authenticate, according to the media data request sent by the OTT client and the authorized subscriber list of the specified channel, permission for the OTT client to join the specified channel, and after the authentication on the OTT client succeeds, send a request to the OTT live proxy server to request to join the multicast group.

In addition, the multicast replication point 1600 may further execute the method in FIG. 4, and implement functions of the multicast replication point in the embodiments shown in FIG. 5 to FIG. 11, and details are not described in this embodiment of the present invention again.

Figure 17:
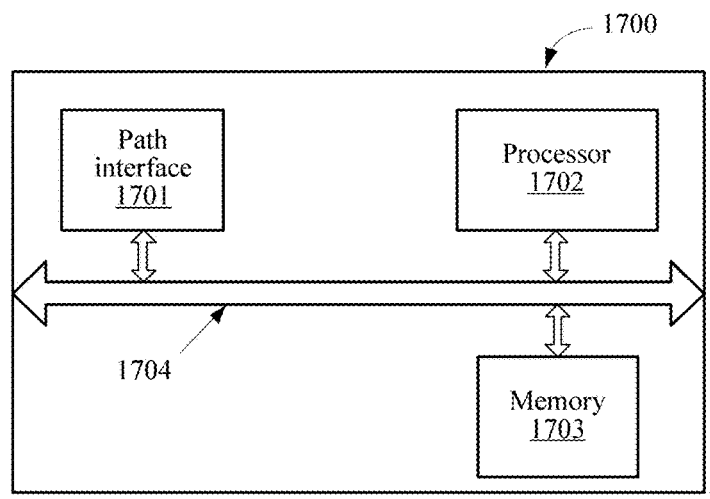
FIG. 17 is still another schematic structural diagram of an OTT live proxy server according to an embodiment.

FIG. 17 is a schematic structural diagram of an OTT live proxy server 1700 according to an embodiment of the present invention. The OTT live proxy server 1700 may include a channel interface 1701, a processor 1702, and a memory 1703.

The channel interface 1701, the processor 1702, and the memory 1703 are connected by using a bus 1704. The bus 1704 may be an ISA bus, a PCI bus, an EISA bus, or the like. The bus may be classified into an address bus, a data bus, a control bus, or the like. For ease of representation, the bus in FIG. 17 is represented by using only a double sided arrow, but it does not indicate that there is only one bus or only one type of bus.

The memory 1703 is configured to store a program. Specifically, the program may include program code, and the program code includes a computer operation instruction. The memory 1703 may include a read-only memory and a random access memory, and provide an instruction and data to the processor 1702. The memory 1703 may include a high-speed RAM memory, and may further include a non-volatile memory, for example, at least one magnetic disk memory.

The processor 1702 executes the program stored in the memory 1703, and is specifically configured to perform the following operations, including allocating a multicast resource to the specified channel according to a multicast resource allocation indication of a specified channel, and a media description of the specified channel, where the multicast resource allocation indication is used to instruct the OTT live proxy server to allocate the multicast resource to the specified channel, the media description of the specified channel includes at least one resolution of the specified channel and a URL corresponding to media data of the at least one resolution, and the multicast resource includes a multicast group corresponding to the specified channel, or a multicast group that corresponds to the specified channel and a port that corresponds to the at least one resolution, obtaining, from an OTT server to which the specified channel belongs and in a unicast manner by using the channel interface 1701 according to the media description of the specified channel, the media data corresponding to the at least one resolution, and converting the media data corresponding to the at least one resolution into multicast media data, and sending, in a multicast manner by using the channel interface 1701, the multicast media data to a multicast replication point that already joins the multicast group.

The method, disclosed in any embodiment in FIG. 2 and FIG. 5 to FIG. 11, executed by the OTT live proxy server may be applied to the processor 1702 or implemented by the processor 1702. The processor 1702 may be an integrated circuit chip and have a signal processing capability. In an implementation process, steps of the foregoing methods may be accomplished by using an integrated logic circuit of hardware in the processor 1702 or an instruction in a form of software. The foregoing processor 1702 may be a general purpose processor, including a central processing unit (CPU for short), a network processor (NP for short), or the like, or may be a digital signal processor (DSP), an application-specific integrated circuit (ASIC), a field programmable gate array (FPGA), or another programmable logical device, discrete gate or transistor logical device, or discrete hardware component. The processor 1702 can implement or execute methods, steps, and logical block diagrams disclosed in the embodiments of the present invention. The general purpose processor may be a microprocessor or the processor may be any conventional processor or the like. Steps of the methods disclosed with reference to the embodiments of the present invention may be directly executed and completed by a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 1703, and the processor 1702 reads information in the memory 1703 and completes the steps of the foregoing methods in combination with hardware of the processor 1702.

In this embodiment of the present invention, the OTT live proxy server allocates a multicast resource of a channel according to a channel allocation indication of an OTT server, obtains media data of the channel from the OTT server, and sends, in a multicast manner, the media data of the channel to a multicast group corresponding to the channel, so that a multicast replication point in the multicast group can transmit the media data of the channel to an OTT client joining the channel. In this way, a large quantity of repeated live streams can be avoided from passing through a backbone network, thereby greatly reducing a quantity of repeated packets transmitted from the OTT server to a metropolitan area network, and reducing bandwidth of a bearer network occupied by live media data.

Optionally, in an embodiment, the processor 1702 is further configured to obtain, by using the channel interface 1701, the media description of the specified channel from the OTT server.

Optionally, in another embodiment, the media description of the specified channel is pre-stored on the OTT live proxy server. An OTT service vendor may pre-store related media descriptions of some or all channels on the OTT live proxy server, to reduce information exchange caused by a media description request.

Optionally, the processor 1702 is further configured to receive the multicast resource allocation indication by using the channel interface 1701. The multicast resource allocation indication is sent by an OTT server of the OTT live proxy server, or the multicast resource allocation indication is sent by a multicast replication point in a metropolitan area network in which the OTT live proxy server is located.

Optionally, the processor 1702 is further configured to: receive, by using the channel interface 1701, a channel joining indication sent by the OTT server, and send the channel joining indication to a multicast replication point in a metropolitan area network in which the OTT live proxy server is located, so that the multicast replication point adds an OTT client to an authorized subscriber list of the specified channel, where the channel joining indication is used to indicate that the OTT client is allowed to join the specified channel.

Optionally, the processor 1702 is further configured to register, with the OTT server by using the channel interface 1701, an IP network segment of the metropolitan area network in which the OTT live proxy server is located and an IP address of the OTT live proxy server.

Optionally, in an embodiment, the processor 1702 is further configured to feed back the allocated multicast resource to the OTT server by using the channel interface 1701, so that the OTT server sends the multicast resource to the OTT client, and the OTT client can join the multicast group.

Optionally, in another embodiment, the processor 1702 is further configured to send, by using the channel interface 1701, a correspondence between the specified channel and the multicast group of the specified channel to the multicast replication point in the metropolitan area network in which the OTT live proxy server is located, so that the multicast replication point determines, according to a request sent by the OTT client for joining the specified channel, the multicast group corresponding to the specified channel.

Further, the processor 1702 is further configured to send the multicast resource to the OTT client by using the channel interface 1701 according to the request sent by the OTT client for joining the specified channel, so that the OTT client requests the media data of the specified channel from the multicast replication point.

Optionally, in an embodiment, the processor 1702 is further configured to: add the multicast replication point to the multicast group according to a multicast joining request of the multicast replication point, and add an egress port corresponding to the multicast replication point to a multicast forwarding entry of the multicast group.

Optionally, in another embodiment, the processor 1702 is further configured to: delete the multicast replication point from the multicast group according to a multicast leave request of the multicast replication point, and delete an egress port corresponding to the multicast replication point from a multicast forwarding entry of the multicast group.

Further, the processor 1702 is further configured to: when a quantity of egress ports in the multicast forwarding entry of the multicast group is zero, delete the multicast forwarding entry of the multicast group, and disconnect a link for downloading the media data of the specified channel from the OTT server.

In addition, the OTT live proxy server 1700 may further execute the method in FIG. 2, and implement functions of the OTT live proxy server in the embodiments shown in FIG. 5 to FIG. 11, and details are not described in this embodiment of the present invention again.

Figure 18:
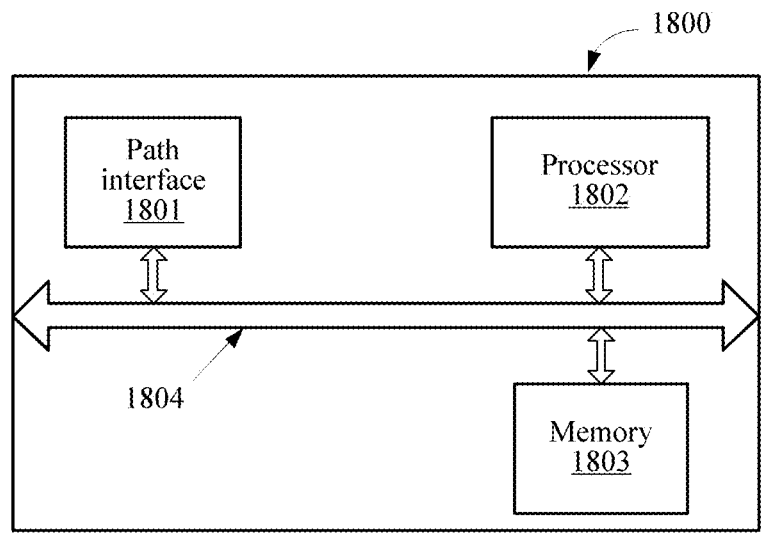
FIG. 18 is still another schematic structural diagram of an OTT server according to an embodiment.

FIG. 18 is a schematic structural diagram of an OTT server 1800 according to an embodiment of the present invention. The OTT server 1800 may include a channel interface 1801, a processor 1802, and a memory 1803.

The channel interface 1801, the processor 1802, and the memory 1803 are connected by using a bus 1804. The bus 1804 may be an ISA bus, a PCI bus, an EISA bus, or the like. The bus may be classified into an address bus, a data bus, a control bus, or the like. For ease of representation, the bus in FIG. 18 is represented by using only a double sided arrow, but it does not indicate that there is only one bus or only one type of bus.

The memory 1803 is configured to store a program. Specifically, the program may include program code, and the program code includes a computer operation instruction. The memory 1803 may include a read-only memory and a random access memory, and provide an instruction and data to the processor 1802. The memory 1803 may include a high-speed RAM memory, and may further include a non-volatile memory, for example, at least one magnetic disk memory.

The processor 1802 executes the program stored in the memory 1803, and is specifically configured to perform the following operations, including sending, by using the channel interface 1801, a multicast resource allocation indication to an OTT live proxy server registered with the OTT server 1800, where the multicast resource allocation indication is used to instruct the OTT live proxy server to allocate a multicast resource to a specified channel, sending, by using the channel interface 1801, a media description of the specified channel to the OTT live proxy server according to a request sent by the OTT live proxy server for obtaining the media description of the specified channel, where the media description of the specified channel includes at least one resolution of the specified channel and a URL corresponding to media data of the at least one resolution, and sending the media data of the at least one resolution of the specified channel to the OTT live proxy server in a unicast manner by using the channel interface 1801 according to a request of the OTT live proxy server for obtaining the media data of the specified channel.

The method, disclosed in any embodiment in FIG. 3 and FIG. 5 to FIG. 11, executed by the OTT server may be applied to the processor 1802 or implemented by the processor 1802. The processor 1802 may be an integrated circuit chip and have a signal processing capability. In an implementation process, steps of the foregoing methods may be accomplished by using an integrated logic circuit of hardware in the processor 1802 or an instruction in a form of software. The foregoing processor 1802 may be a general purpose processor, including a central processing unit (CPU for short), a network processor (NP for short), or the like, or may be a digital signal processor (DSP), an application-specific integrated circuit (ASIC), a field programmable gate array (FPGA), or another programmable logical device, discrete gate or transistor logical device, or discrete hardware component. The processor 1802 can implement or execute methods, steps, and logical block diagrams disclosed in the embodiments of the present invention. The general purpose processor may be a microprocessor or the processor may be any conventional processor or the like. Steps of the methods disclosed with reference to the embodiments of the present invention may be directly executed and completed by a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 1803, and the processor 1802 reads information in the memory 1803 and completes the steps of the foregoing methods in combination with hardware of the processor 1802.

In this embodiment of the present invention, the OTT server 1800 instructs an OTT live proxy server to create a multicast group and allocate a multicast resource of a channel, and sends media data of the channel to the OTT live proxy server in a unicast manner, so that the OTT live proxy server sends, by using a multicast replication point, the media data of the channel to an OTT client joining the multicast group. In this way, a large quantity of repeated live streams can be avoided from passing through a backbone network, thereby greatly reducing a quantity of repeated packets transmitted from the OTT server to a metropolitan area network, and reducing bandwidth of a bearer network occupied by live media data.

Optionally, the processor 1802 is further configured to record an Internet Protocol (IP) network segment of a metropolitan area network in which the OTT live proxy server is located and an IP address of the OTT live proxy server according to a registration request sent by the OTT live proxy server. The registration request carries the IP network segment of the metropolitan area network in which the OTT live proxy server is located and the IP address of the OTT live proxy server.

Optionally, in an embodiment, the processor 1802 is further configured to determine, according to a request for joining the specified channel by an OTT client in the metropolitan area network in which the OTT live proxy server is located, whether to allow the OTT client to join the specified channel. Further, in a process of sending, by the OTT server, the multicast resource allocation indication to the OTT live proxy server registered with the OTT server, the processor 1802 is specifically configured to: when the processor 1802 determines to allow the OTT client to join the specified channel, and a multicast resource of the specified channel sent by the OTT live proxy server does not exist in the OTT server, send the multicast resource allocation indication to the OTT live proxy server.

Optionally, the processor 1802 is further configured to: after allowing the OTT client to join the specified channel, send a channel joining indication to the OTT live proxy server, where the channel joining indication is used to notify the OTT live proxy server that the OTT client is allowed to join the specified channel.

Further, in an embodiment, the processor 1802 is further configured to send, to the OTT client, the multicast resource that is fed back by the OTT live proxy server and that is allocated to the specified channel, so that the OTT client requests the media data of the specified channel from the multicast replication point. The multicast resource includes a multicast group corresponding to the specified channel, or a multicast group corresponding to the specified channel and a port corresponding to the at least one resolution of the specified channel.

Alternatively, further, in another embodiment, the processor 1802 is further configured to instruct, according to the request of the OTT client for joining the specified channel and the multicast resource of the specified channel, the OTT client to redirect the request for joining the specified channel to the OTT live proxy server.

In addition, the OTT server 1800 may further execute the method in FIG. 3, and implement functions of the OTT server in the embodiments shown in FIG. 5 to FIG. 11, and details are not described in this embodiment of the present invention again.

Figure 19:
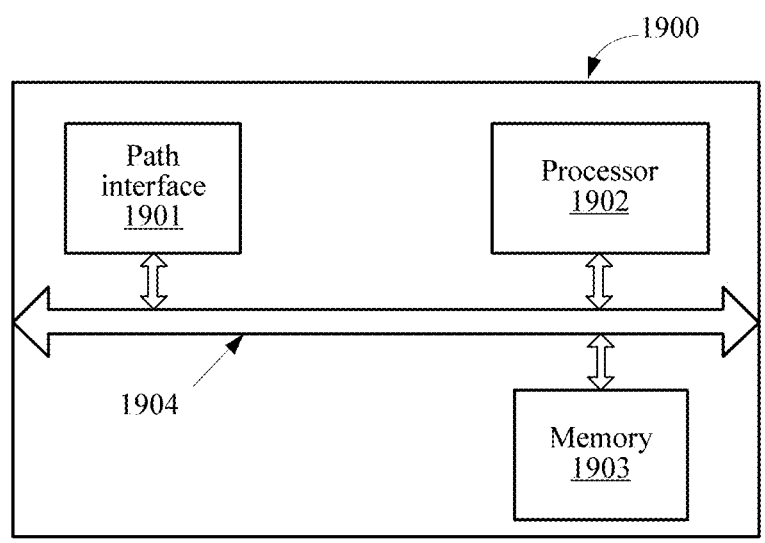
FIG. 19 is another schematic structural diagram of a multicast replication point according to an embodiment.

FIG. 19 is a schematic structural diagram of a multicast replication point 1900 according to an embodiment of the present invention. The multicast replication point 1900 may include a channel interface 1901, a processor 1902, and a memory 1903.

The channel interface 1901, the processor 1902, and the memory 1903 are connected by using a bus 1904. The bus 1904 may be an ISA bus, a PCI bus, an EISA bus, or the like. The bus may be classified into an address bus, a data bus, a control bus, or the like. For ease of representation, the bus in FIG. 19 is represented by using only a double sided arrow, but it does not indicate that there is only one bus or only one type of bus.

The memory 1903 is configured to store a program. Specifically, the program may include program code, and the program code includes a computer operation instruction. The memory 1903 may include a read-only memory and a random access memory, and provide an instruction and data to the processor 1902. The memory 1903 may include a high-speed RAM memory, and may further include a non-volatile memory, for example, at least one magnetic disk memory.

The processor 1902 executes the program stored in the memory 1903, and is specifically configured to perform the following operations sending, by using the channel interface 1901, a request to an OTT live proxy server in a metropolitan area network, to request to join a multicast group that is allocated by the OTT live proxy server to a specified channel; receiving, by using the channel interface 1901, media data of the specified channel that is sent by the OTT live proxy server in a multicast manner, and sending, by using the channel interface 1901, the media data of the specified channel to an OTT client in a multicast or unicast manner.

The method, disclosed in any embodiment in FIG. 4 to FIG. 11, executed by the multicast replication point may be applied to the processor 1902 or implemented by the processor 1902. The processor 1902 may be an integrated circuit chip and have a signal processing capability. In an implementation process, steps of the foregoing methods may be accomplished by using an integrated logic circuit of hardware in the processor 1902 or an instruction in a form of software. The foregoing processor 1902 may be a general purpose processor, including a central processing unit (CPU for short), a network processor (NP for short), or the like, or may be a digital signal processor (DSP), an application-specific integrated circuit (ASIC), a field programmable gate array (FPGA), or another programmable logical device, discrete gate or transistor logical device, or discrete hardware component. The processor 1902 can implement or execute methods, steps, and logical block diagrams disclosed in the embodiments of the present invention. The general purpose processor may be a microprocessor or the processor may be any conventional processor or the like. Steps of the methods disclosed with reference to the embodiments of the present invention may be directly executed and completed by a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 1903, and the processor 1902 reads information in the memory 1903 and completes the steps of the foregoing methods in combination with hardware of the processor 1902.

In this embodiment of the present invention, the multicast replication point 1900 obtains media data of a channel from a multicast group created by an OTT live proxy server and sends the media data to an OTT client, so that the OTT client does not need to directly obtain the media data of the channel from an OTT server. In this way, a large quantity of repeated live streams can be avoided from passing through a backbone network, thereby greatly reducing a quantity of repeated packets transmitted from the OTT server to a metropolitan area network, and reducing bandwidth of a bearer network occupied by live media data.

Optionally, in an embodiment, the processor 1902 is further configured to: add the OTT client to a multicast forwarding table of the multicast replication point according to a multicast joining request for joining the specified channel or a media data request, and send a request to the OTT live proxy server to request to join the multicast group, where the multicast joining request for joining the specified channel or the media data request is sent by the OTT client.

Optionally, in another embodiment, the processor 1902 is further configured to delete the OTT client from a multicast forwarding table of the multicast replication point according to a request sent by the OTT client for leaving the specified channel.

Optionally, the processor 1902 is further configured to add the OTT client to an authorized subscriber list of the specified channel according to a channel joining indication sent by the OTT live proxy server. The channel joining indication is used to indicate that the OTT client is allowed to join the specified channel.

It should be understood that, before adding the OTT client to the authorized subscriber list of the specified channel according to the channel joining indication sent by the OTT live proxy server, the processor 1902 is further configured to receive, by using the channel interface 1901, the channel joining indication sent by the OTT live proxy server.

Further, the processor 1902 is further configured to: when a quantity of OTT clients in the multicast forwarding table of the multicast replication point is zero, send a multicast leave request to the OTT live proxy server to request to leave the multicast group.

Certainly, it should be understood that, the foregoing methods may be combined and used. For example, the processor 1902 is further configured to authenticate, according to the media data request sent by the OTT client and the authorized subscriber list of the specified channel, permission for the OTT client to join the specified channel, and after the authentication on the OTT client succeeds, send a request to the OTT live proxy server to request to join the multicast group.

In addition, the multicast replication point 1900 may further execute the method in FIG. 4, and implement functions of the multicast replication point in the embodiments shown in FIG. 5 to FIG. 11, and details are not described in this embodiment of the present invention again.

As shown in FIG. 1, an OTT system may include an OTT server, an OTT live proxy server, a multicast replication point, and an OTT client. The OTT server may be the OTT server in the embodiment shown in FIG. 14, FIG. 15, or FIG. 18. The OTT live proxy server may be the OTT live proxy server in the embodiment shown in FIG. 12, FIG. 13, or FIG. 17. The multicast replication point may be the multicast replication point in the embodiment shown in FIG. 16 or FIG. 19. The OTT client may be an OTT client having a unicast or multicast receiving capability.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that, the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An over the top (OTT) live proxy server, comprising:
a processor; and
a non-transitory computer-readable storage medium storing a program to be executed by the processor, the program including instructions for:
allocating a multicast resource to a specified channel according to a multicast resource allocation indication of the specified channel and a media description of the specified channel, wherein the multicast resource allocation indication instructs the OTT live proxy server to allocate the multicast resource to the specified channel, wherein the media description of the specified channel comprises at least one resolution of the specified channel and a uniform resource locator (URL) corresponding to media data of the at least one resolution, and wherein the multicast resource comprises a multicast group corresponding to the specified channel;
obtaining, from an OTT server to which the specified channel belongs and in a unicast manner according to the media description of the specified channel, the media data corresponding to the at least one resolution; and
converting the media data corresponding to the at least one resolution into multicast media data, and sending the multicast media data to the multicast group in a multicast manner.

2. The OTT live proxy server according to claim 1, wherein the multicast resource further comprises a port corresponding to the at least one resolution.

3. The OTT live proxy server according to claim 1, wherein the program further includes instructions for obtaining the media description of the specified channel from the OTT server.

4. The OTT live proxy server according to claim 1, wherein the media description of the specified channel is pre-stored on the OTT live proxy server.

5. The OTT live proxy server according to claim 1, wherein the multicast resource allocation indication is received from the OTT server.

6. The OTT live proxy server according to claim 1, wherein the multicast resource allocation indication is received from a multicast replication point in a metropolitan area network in which the OTT live proxy server is located.

7. The OTT live proxy server according to claim 1, wherein the program further includes instructions for receiving a channel joining indication sent by the OTT server, and sending the channel joining indication to a multicast replication point in a metropolitan area network in which the OTT live proxy server is located, so that the multicast replication point adds an OTT client to an authorized subscriber list of the specified channel, wherein the channel joining indication indicates that the OTT client is allowed to join the specified channel.

8. The OTT live proxy server according to claim 7, wherein the program further includes instructions for registering, with the OTT server, an Internet Protocol (IP) network segment of the metropolitan area network in which the OTT live proxy server is located and an IP address of the OTT live proxy server.

9. The OTT live proxy server according to claim 7, wherein the program further includes instructions for feeding back the allocated multicast resource to the OTT server, so that the OTT server sends the multicast resource to the OTT client, and the OTT client joins the multicast group.

10. The OTT live proxy server according to claim 7, wherein the program further includes instructions for sending a correspondence between the specified channel and the multicast group of the specified channel to the multicast replication point in the metropolitan area network in which the OTT live proxy server is located, so that the multicast replication point determines, according to a request sent by the OTT client for joining the specified channel, the multicast group corresponding to the specified channel.

11. The OTT live proxy server according to claim 10, wherein the program further includes instructions for sending the multicast resource to the OTT client according to the request sent by the OTT client for joining the specified channel, so that the OTT client requests the media data of the specified channel from the multicast replication point.

12. The OTT live proxy server according to claim 1, the program further includes instructions for:
adding the multicast replication point to the multicast group according to a multicast joining request of the multicast replication point; and
adding an egress port corresponding to the multicast replication point to a multicast forwarding entry of the multicast group.

13. The OTT live proxy server according to claim 1, wherein the program further includes instructions for:
deleting the multicast replication point from the multicast group according to a multicast leave request of the multicast replication point; and
deleting an egress port corresponding to the multicast replication point from a multicast forwarding entry of the multicast group.

14. The OTT live proxy server according to claim 13, wherein the program further includes instructions for performing, when a quantity of egress ports in the multicast forwarding entry of the multicast group is zero:
deleting the multicast forwarding entry of the multicast group; and
disconnecting a link for downloading the media data of the specified channel from the OTT server.

15. An over the top (OTT) server, comprising:
a processor; and
a non-transitory computer-readable storage medium storing a program to be executed by the processor, the program including instructions for:
sending a multicast resource allocation indication to an OTT live proxy server registered with the OTT server, wherein the multicast resource allocation indication instructs the OTT live proxy server to allocate a multicast resource to a specified channel;
sending a media description of the specified channel to the OTT live proxy server according to a request sent by the OTT live proxy server for obtaining the media description of the specified channel, wherein the media description of the specified channel comprises at least one resolution of the specified channel and a uniform resource locator (URL) corresponding to media data of the at least one resolution; and
sending the media data of the at least one resolution of the specified channel to the OTT live proxy server in a unicast manner according to a request of the OTT live proxy server for obtaining the media data of the specified channel.

16. The OTT server according to claim 15, wherein the program further includes instructions for:
determining, according to a request for joining the specified channel by an OTT client in the metropolitan area network in which the OTT live proxy server is located, whether to allow the OTT client to join the specified channel;
wherein the sending the multicast resource allocation indication comprises sending the multicast resource allocation indication to the OTT live proxy server after determining to allow the OTT client to join the specified channel, and when the multicast resource of the specified channel sent by the OTT live proxy server does not exist in the OTT server.

17. The OTT server according to claim 16, wherein the program further includes instructions for sending a channel joining indication to the OTT live proxy server after allowing the OTT client to join the specified channel.

18. The OTT server according to claim 16, wherein the program further includes instructions for instructing, according to the request of the OTT client for joining the specified channel and the multicast resource of the specified channel, the OTT client to redirect the request for joining the specified channel to the OTT live proxy server.

19. A media data live broadcast method, comprising:
allocating a multicast resource to a specified channel according to a multicast resource allocation indication of the specified channel and a media description of the specified channel, wherein the multicast resource allocation indication instructs an OTT live proxy server to allocate the multicast resource to the specified channel, wherein the media description of the specified channel comprises at least one resolution of the specified channel and a uniform resource locator URL corresponding to media data of the at least one resolution, and wherein the multicast resource comprises at least one of a multicast group corresponding to the specified channel, or a multicast group corresponding to the specified channel and a port corresponding to the at least one resolution;
obtaining, from an OTT server to which the specified channel belongs and in a unicast manner according to the media description of the specified channel, the media data corresponding to the at least one resolution; and
converting the media data corresponding to the at least one resolution into multicast media data, and sending the multicast media data to the multicast group in a multicast manner.

20. A media data live broadcast method, comprising:
sending, by an over the top (OTT) server, a multicast resource allocation indication to an OTT live proxy server registered with the OTT server, wherein the multicast resource allocation indication instructs the OTT live proxy server to allocate a multicast resource to a specified channel;
sending, by the OTT server, a media description of the specified channel to the OTT live proxy server according to a request sent by the OTT live proxy server for obtaining the media description of the specified channel, wherein the media description of the specified channel comprises at least one resolution of the specified channel and a uniform resource locator (URL) corresponding to media data of the at least one resolution; and
sending, by the OTT server, the media data of the at least one resolution of the specified channel to the OTT live proxy server in a unicast manner according to a request of the OTT live proxy server for obtaining the media data of the specified channel.

* * * * *